(12) United States Patent
Suganumata

(10) Patent No.: US 11,835,403 B2
(45) Date of Patent: Dec. 5, 2023

(54) STRAIN INDUCING BODY FOR SUPPRESSING DISPLACEMENT OF SENSOR CHIP MOUNTING SITE AND FORCE SENSOR DEVICE INCLUDING THE SAME

(71) Applicant: MINEBEA MITSUMI Inc., Nagano (JP)

(72) Inventor: Masayuki Suganumata, Tokyo (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 17/654,428

(22) Filed: Mar. 11, 2022

(65) Prior Publication Data

US 2022/0299384 A1 Sep. 22, 2022

(30) Foreign Application Priority Data

Mar. 19, 2021 (JP) ................... 2021-045998
Mar. 19, 2021 (JP) ................... 2021-045999
Mar. 19, 2021 (JP) ................... 2021-046000

(51) Int. Cl.
   *G01L 1/18* (2006.01)
(52) U.S. Cl.
   CPC ..................... *G01L 1/18* (2013.01)
(58) Field of Classification Search
   CPC ......... G01L 1/26; G01L 5/223; G01L 1/2231; G01L 1/2293; G01L 5/1627; G01L 5/226; B25J 13/085; B81B 3/0051
   See application file for complete search history.

(56) References Cited

U.S. PATENT DOCUMENTS 6,477,904 B2 * 11/2002 Maeda .................. G01L 5/223
                                              73/862.044
6,823,744 B2 * 11/2004 Ohsato .................. G01L 5/162
                                              73/862.041
(Continued)

FOREIGN PATENT DOCUMENTS

EP     1327870     7/2003
EP     1739401     1/2007
(Continued)

OTHER PUBLICATIONS

Extended European Search Report dated Jul. 20, 2022 with respect to the corresponding European patent application No. 22161972.9.

*Primary Examiner* — Tran M. Tran
(74) *Attorney, Agent, or Firm* — IPUSA, PLLC

(57) ABSTRACT

A strain inducing body includes a strain inducing portion including a movable portion that deforms in response to force or moment in a predetermined axial direction and a non-movable portion that does not deform in response to the force or moment, and an input transmitter that is connected to the non-movable portion and does not deform in response to the force or the moment, wherein the input transmitter includes, a first frame portion, a plurality of first beam structures each of which has one end thereof connected to the first frame portion and extends from the first frame portion to an inside of the first frame portion, a first coupling portion that connects other ends of the first beam structures, an accommodating portion that is provided inside the first coupling portion and that is capable of housing a sensor chip to detect the force or the moment.

13 Claims, 33 Drawing Sheets

(56) References Cited

U.S. PATENT DOCUMENTS

| | | | | |
|---|---|---|---|---|
| 6,951,142 | B2* | 10/2005 | Ohsato | G01L 5/162 |
| | | | | 73/862.041 |
| 7,210,362 | B2* | 5/2007 | Tsutaya | G01G 3/14 |
| | | | | 73/862.627 |
| 7,423,511 | B2* | 9/2008 | Nakasone | G01L 1/26 |
| | | | | 29/595 |
| 7,637,174 | B2* | 12/2009 | Hirabayashi | G01L 1/26 |
| | | | | 73/862.041 |
| 7,938,028 | B2* | 5/2011 | Hirabayashi | G01L 5/162 |
| | | | | 73/862.626 |
| 8,113,065 | B2* | 2/2012 | Ohsato | G01L 1/2231 |
| | | | | 29/610.1 |
| 8,183,077 | B2* | 5/2012 | Vaganov | G01L 1/2231 |
| | | | | 257/417 |
| 8,196,477 | B2* | 6/2012 | Ohsato | G01L 1/26 |
| | | | | 73/766 |
| 8,350,345 | B2* | 1/2013 | Vaganov | G06F 3/0338 |
| | | | | 257/419 |
| 8,453,523 | B2* | 6/2013 | Sato | G01L 5/164 |
| | | | | 73/862.69 |
| 8,607,646 | B2* | 12/2013 | Ohsato | G01P 15/123 |
| | | | | 73/862.044 |
| 8,800,391 | B2* | 8/2014 | Zhang | G01L 1/2231 |
| | | | | 73/862.632 |
| 9,003,899 | B2* | 4/2015 | Wade | G01L 1/18 |
| | | | | 73/862.632 |
| 9,016,144 | B2* | 4/2015 | Bente, IV | G01L 1/2231 |
| | | | | 73/862.53 |
| 9,243,964 | B2* | 1/2016 | Brode | G01L 1/2231 |
| 10,634,695 | B2* | 4/2020 | Yamaguchi | G01L 1/2268 |
| 10,732,060 | B2* | 8/2020 | Strauss | B25J 13/085 |
| 10,801,904 | B2* | 10/2020 | Yamaguchi | G01L 1/2218 |
| 10,976,208 | B2* | 4/2021 | Suzuki | G01L 3/00 |
| 11,085,842 | B2* | 8/2021 | Suzuki | G01L 1/22 |
| 11,215,518 | B2* | 1/2022 | Endo | G01L 5/1627 |
| 11,300,397 | B2* | 4/2022 | Kim | B25J 9/163 |
| 11,473,987 | B2* | 10/2022 | Yamaguchi | G01L 1/2206 |
| 11,662,261 | B2* | 5/2023 | Yamaguchi | G01L 5/226 |
| | | | | 73/862.627 |
| 2003/0140713 | A1 | 7/2003 | Ohsato et al. | |
| 2009/0301226 | A1* | 12/2009 | Hirabayashi | G01L 5/162 |
| | | | | 73/862.626 |
| 2010/0011885 | A1* | 1/2010 | Ohsato | G01L 1/18 |
| | | | | 73/862.627 |
| 2018/0313866 | A1* | 11/2018 | Yamaguchi | G01L 1/18 |
| 2021/0123824 | A1* | 4/2021 | Taki | G01L 5/226 |
| 2023/0044489 | A1* | 2/2023 | Mastinu | G01L 3/22 |

FOREIGN PATENT DOCUMENTS

| | | |
|---|---|---|
| EP | 3748322 | 12/2020 |
| EP | 4019923 | 6/2022 |
| JP | 2003-254843 | 9/2003 |

* cited by examiner

STRAIN INDUCING BODY FOR SUPPRESSING DISPLACEMENT OF SENSOR CHIP MOUNTING SITE AND FORCE SENSOR DEVICE INCLUDING THE SAME

CROSS-REFERENCE TO RELATED APPLICATION

The present application is based on and claims priority under 35 U.S.C. § 119 to Japanese Patent Application No. 2021-045998, filed on Mar. 19, 2021, Japanese Patent Application No. 2021-045999, filed on Mar. 19, 2021, Japanese Patent Application No. 2021-046000, filed on Mar. 19, 2021, the contents of which are incorporated herein by reference in their entirety.

BACKGROUND OF THE INVENTION

1. Field of the Invention

The present invention relates to a strain inducing body and a force sensor device.

2. Description of the Related Art

Conventionally, force sensor devices for detecting displacements in one or more predetermined axial directions have been known. As an example of such a force sensor device, a force sensor device includes a structure including a sensor chip, an external force receiving plate that is disposed around the sensor chip and to which an external force is applied, a base that supports the sensor chip, an external force-buffering mechanism that secures the external force receiving plate to the base, and a coupling rod that is an external force-transmitting mechanism, where the external force receiving plate and an effect portion are coupled to each other by the coupling rod (for example, Patent Document 1).

Patent Document 1: Japanese Patent Laid-Open No. 2003-254843

SUMMARY OF THE INVENTION

In a force sensor device, a strain inducing body used in combination with a sensor chip is fastened to a robotic flange, for example, by screws or the like. When the strain inducing body is fastened to a target object, the target object may generate heat, and the strain inducing body is overheated under the influence of the heat generated on the target object, and a temperature distribution is generated in the strain inducing body. When the heat distribution is generated on the strain inducing body, portions where the sensor chip is disposed may be deformed due to the expansion or deformation of the strain inducing body, and output (offset) may occur to the sensor chip. When the output is generated at the sensor chip, there is concern that the load-bearing capacity of the sensor chip will deteriorate, that the force characteristic of the sensor chip will deteriorate, and that the output that is generated depending on the fastening state will change over time and the temperature characteristic will deteriorate.

The present invention has been made in view of the above points and is intended to provide a strain inducing body capable of suppressing the displacement of the portion where the sensor chip is positioned when the strain inducing body is mount to a target object.

Problems to be Solved by the Invention

A strain inducing body includes a strain inducing portion including a movable portion that deforms in response to force or moment in a predetermined axial direction and a non-movable portion that does not deform in response to the force or moment, and an input transmitter that is connected to the non-movable portion and does not deform in response to the force or moment, wherein the input transmitter includes, a first frame portion, a plurality of first beam structures each of which has one end thereof connected to the first frame portion and extends from the first frame portion to an inside of the first frame portion, a first coupling portion that connects other ends of the first beam structures, an accommodating portion that is provided inside the first coupling portion and that is capable of housing a sensor chip to detect the force or the moment.

The reference numerals in parentheses are appended for ease of understanding and are merely an example and are not limited to the illustrated embodiment.

Effects of the Invention

The disclosed technique provides a strain inducing body that can suppress the displacement of the portion where the sensor chip is placed when the strain inducing body is mount on a target object.

DETAILED DESCRIPTION OF THE PREFERRED EMBODIMENTS

Figure 1:
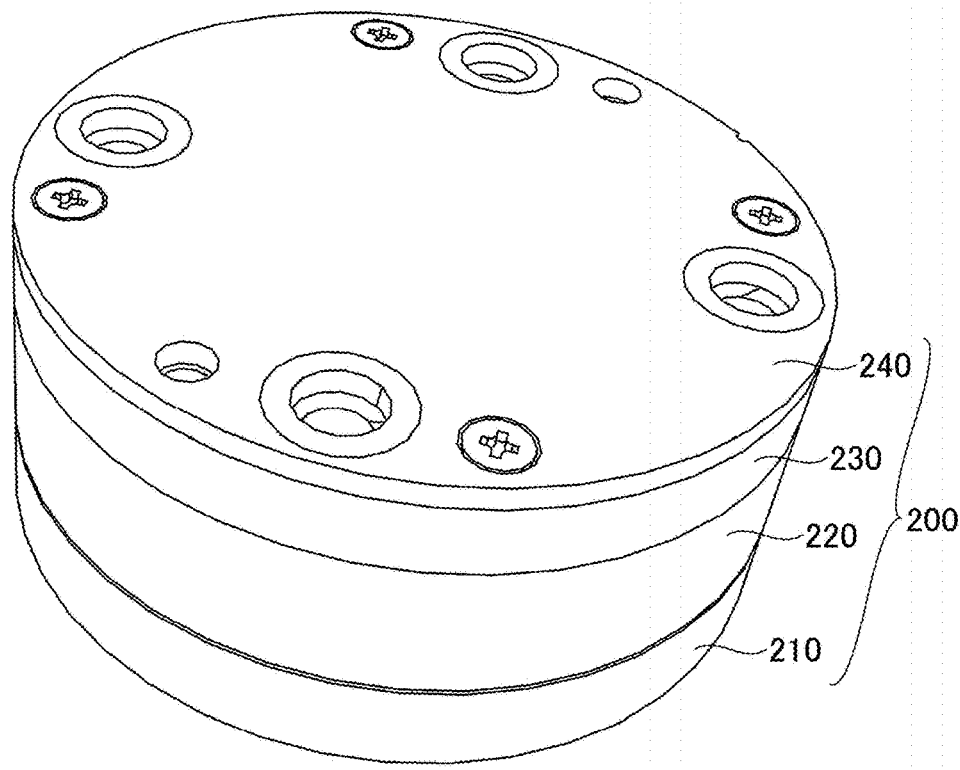
FIG. 1 is a perspective view illustrating a force sensor device according to the first embodiment.

Hereinafter, embodiments for carrying out the invention with reference to the drawings will be described. In each drawing, the same components are indicated by the same reference numerals and overlapping descriptions may be omitted.

First Embodiment (Schematic Configuration of Force Sensor Device 1)

Figure 2:
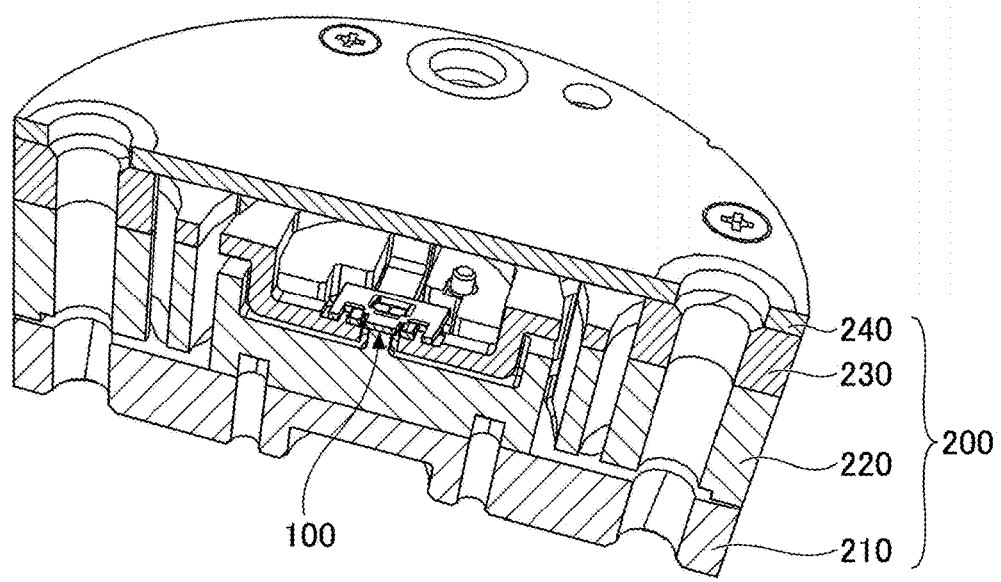
FIG. 2 is a cross-sectional perspective view illustrating the force sensor device according to the first embodiment.

FIG. 1 is a perspective view of a force sensor device according to a first embodiment. FIG. 2 is a cross-sectional perspective view of the force sensor device according to the first embodiment. Referring to FIG. 1 and FIG. 2, the force sensor device 1 includes a sensor chip 100 and a strain inducing body 200. The force sensor device 1 is, for example, a multi-axis force sensor device provided in an arm, a finger, or the like of a robot that is used for a machine tool or the like.

The sensor chip 100 has a function of detecting up to six axes relating to displacements in predetermined axial directions. The strain inducing body 200 has a function of transmitting at least one among an applied force and a moment, to the sensor chip 100. In the following description of embodiments, for example, a case in which the sensor chip 100 detects six axes will be described, but there is no limitation to such a sensor chip. For example, the sensor chip 100 that detects three axes or the like can be adopted.

The strain inducing body 200 includes a force receiving plate 210, a strain inducing portion 220, an input transmitter 230, and a cover plate 240. The strain inducing portion 220 is stacked on the force receiving plate 210, the input transmitter 230 is stacked on the strain inducing portion 220, and the cover plate 240 is stacked on the input transmitter 230. The strain inducing body 200 is substantially cylindrical as a whole. The function of the strain inducing body 200 is mainly implemented by the strain inducing portion 220 and the input transmitter 230, and thus the force receiving plate 210 and the cover plate 240 may be provided as needed.

In the present embodiment, for the sake of convenience, for the force sensor device 1, the side of the cover plate 240 is referred to as a top side or one side, and the side of the force receiving plate 210 is referred to as a bottom side or another side. Further, for each component, the surface on the side of the cover plate 240 is referred to as one surface or a top surface, and the surface on the side of the force receiving plate 210 is referred to as another surface or a bottom surface. The force sensor device 1 may be used in a state of being upside down, or can be disposed at any angle. A plan view means that an object is viewed in a direction (Z-axis direction) normal to the top surface of the cover plate 240, and a planar shape refers to a shape of the object when viewed in the direction (Z-axial direction) normal to the top surface of the cover plate 240.

Figure 3:
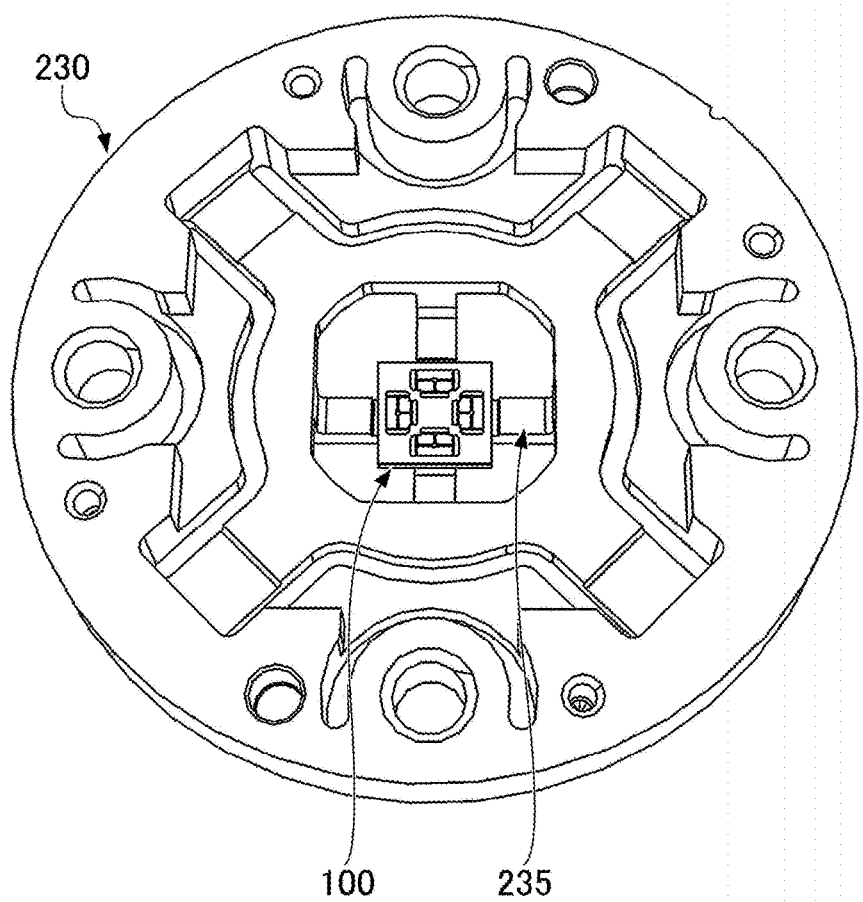
FIG. 3 is a perspective top view of a sensor chip attached to an input transmitter.
Figure 4:
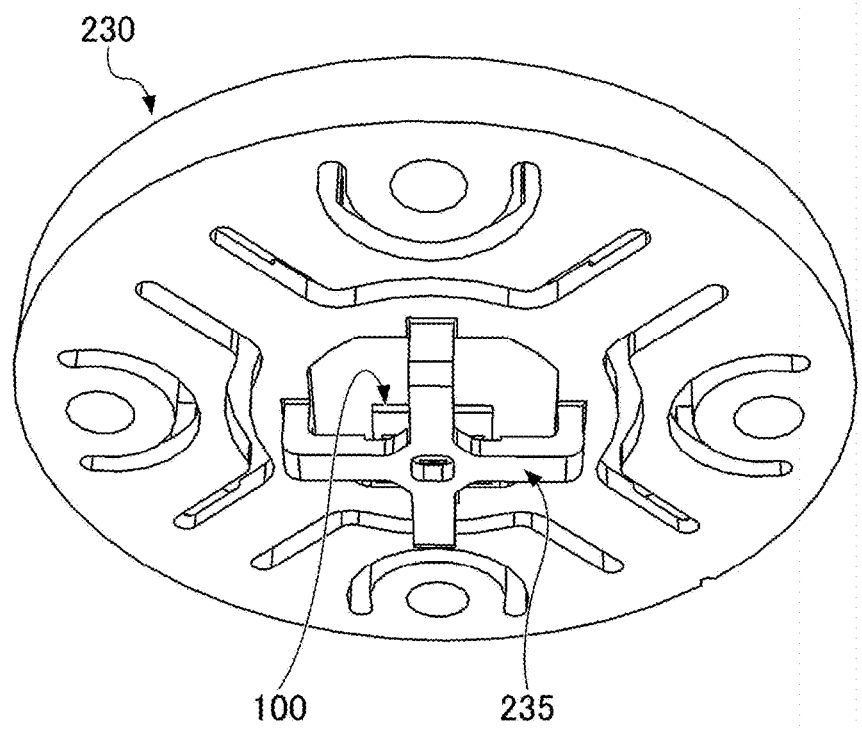
FIG. 4 is a perspective bottom view of the sensor chip attached to the input transmitter.

FIG. 3 is a perspective top view of the sensor chip attached to the input transmitter. FIG. 4 is a perspective bottom view of the sensor chip attached to the input transmitter. As illustrated in FIG. 3 and FIG. 4, an accommodating portion that protrudes from the bottom surface of the input transmitter 230, toward the strain inducing portion 220, is provided in the input transmitter 230. The sensor chip 100 is secured to the accommodating portion 235 toward the cover plate 240.

Specifically, as will be described later, four second connection portions 235d (see FIGS. 19 to 22, or the like, which will be described later) protruding from the cover plate 240 are disposed in the accommodating portion 235. Each of the second connection portions 235d is connected to the bottom surface of the force point portions 151 to 154 (see FIGS. 5 to 8, or the like, which will be described later) of the sensor chip 100.

The accommodating portion 235 enters the strain inducing portion 220 side. As will be described later, five columns-shaped first connection portions 224 (see FIG. 17, which will be described later) of protruding from the input transmitter 230 is disposed in the strain inducing portion 220. Each of the first connection portions 224 is connected to the bottom surface of supports 101 to 105 of the sensor chip 100 (see FIGS. 5 to 8, or the like, which will be described later).

The sensor chip 100 and the strain inducing body 200 will be described below in detail. In the following description, the word "parallel" is intended to include a case in which an angle between two straight lines or sides is in the range of 0°±10°. The word "vertical" or "perpendicular" is intended to include a case in which an angle between two straight lines or between sides is in the range of 90°±10°. However, when a special specification is described, it is applied. The word "center" and "middle" are intended to include an approximate center and middle of an object, and are not intended to mean only an exact center and middle. In other words, variations in manufacturing error shall be tolerable. The same applies to point symmetry and line symmetry.

(Sensor Chip 100)

Figure 5:
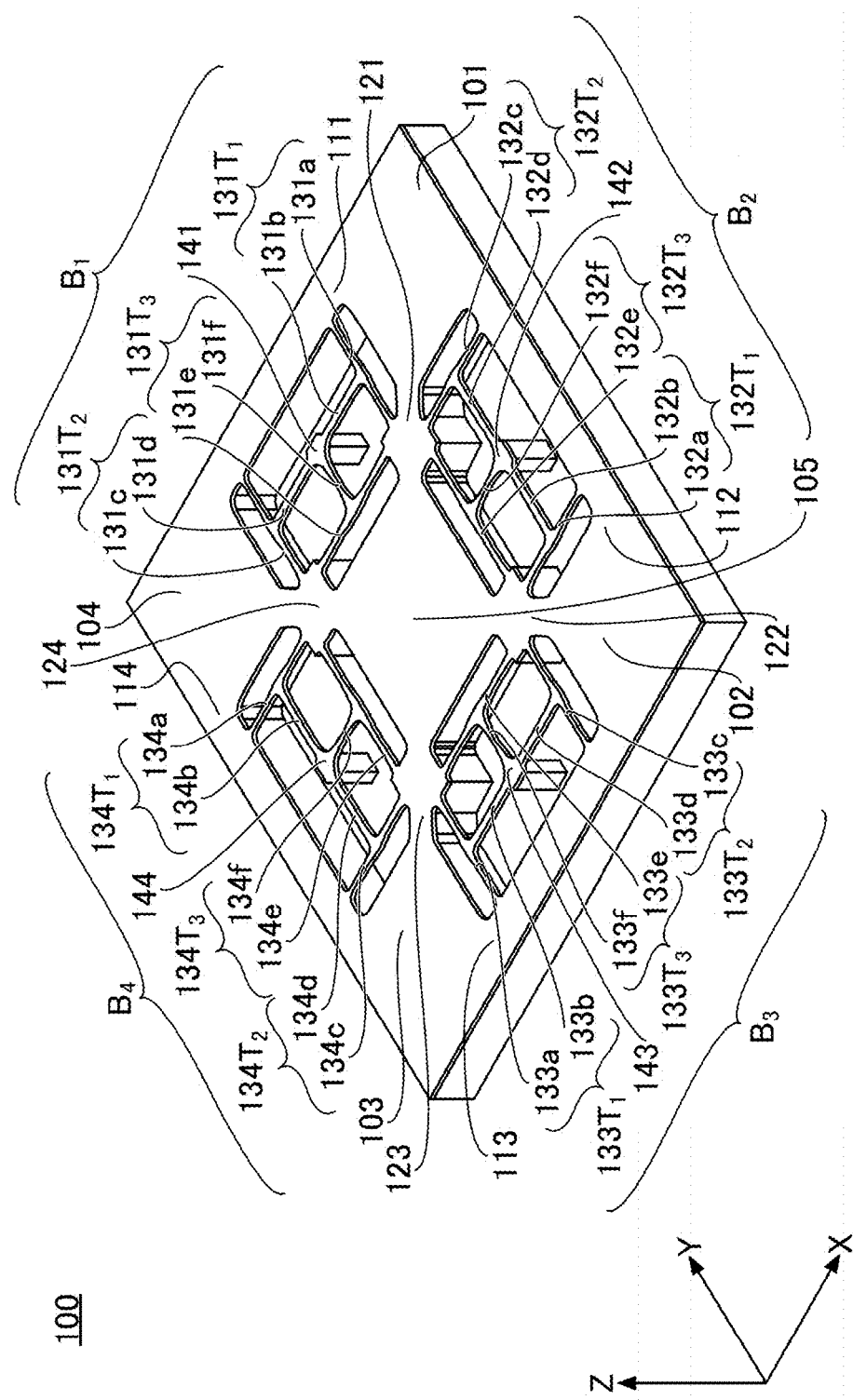
FIG. 5 is a perspective view of a sensor chip 100 when viewed in a positive Z-axis direction.
Figure 6:
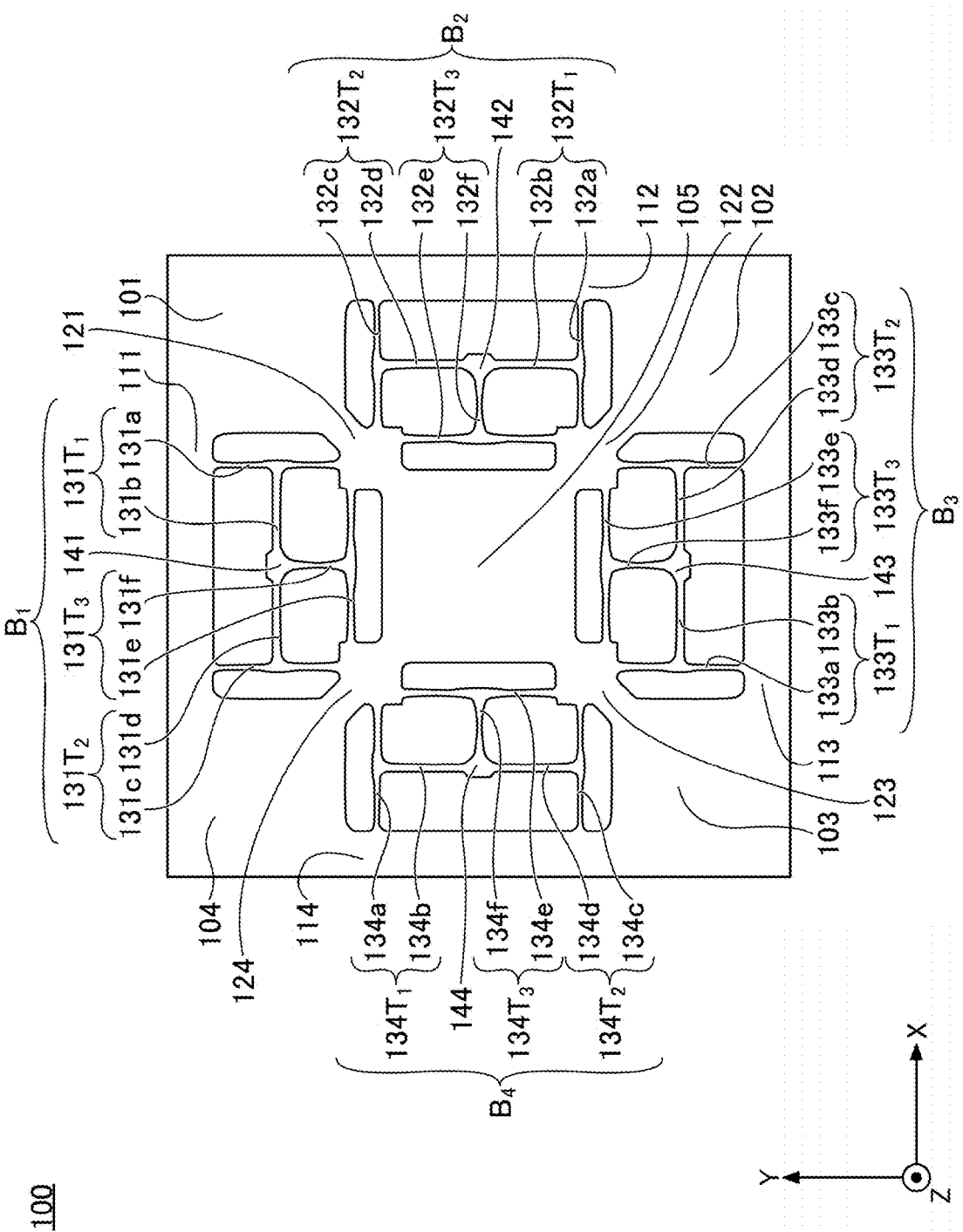
FIG. 6 is a plan view of the sensor chip 100 when viewed in the positive Z-axis direction.
Figure 7:
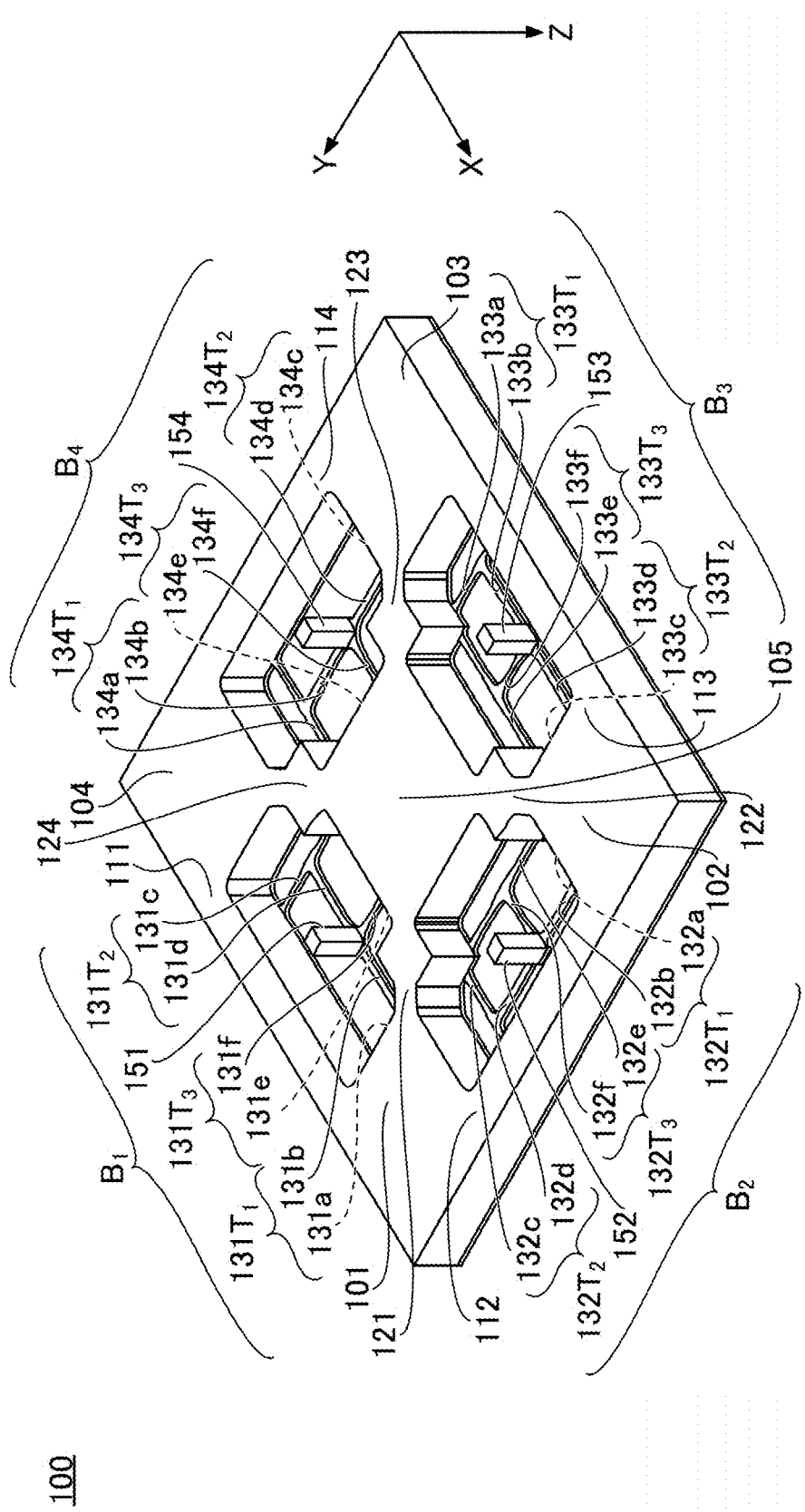
FIG. 7 is a perspective view of the sensor chip 100 when viewed in a negative Z-axis direction.
Figure 8:
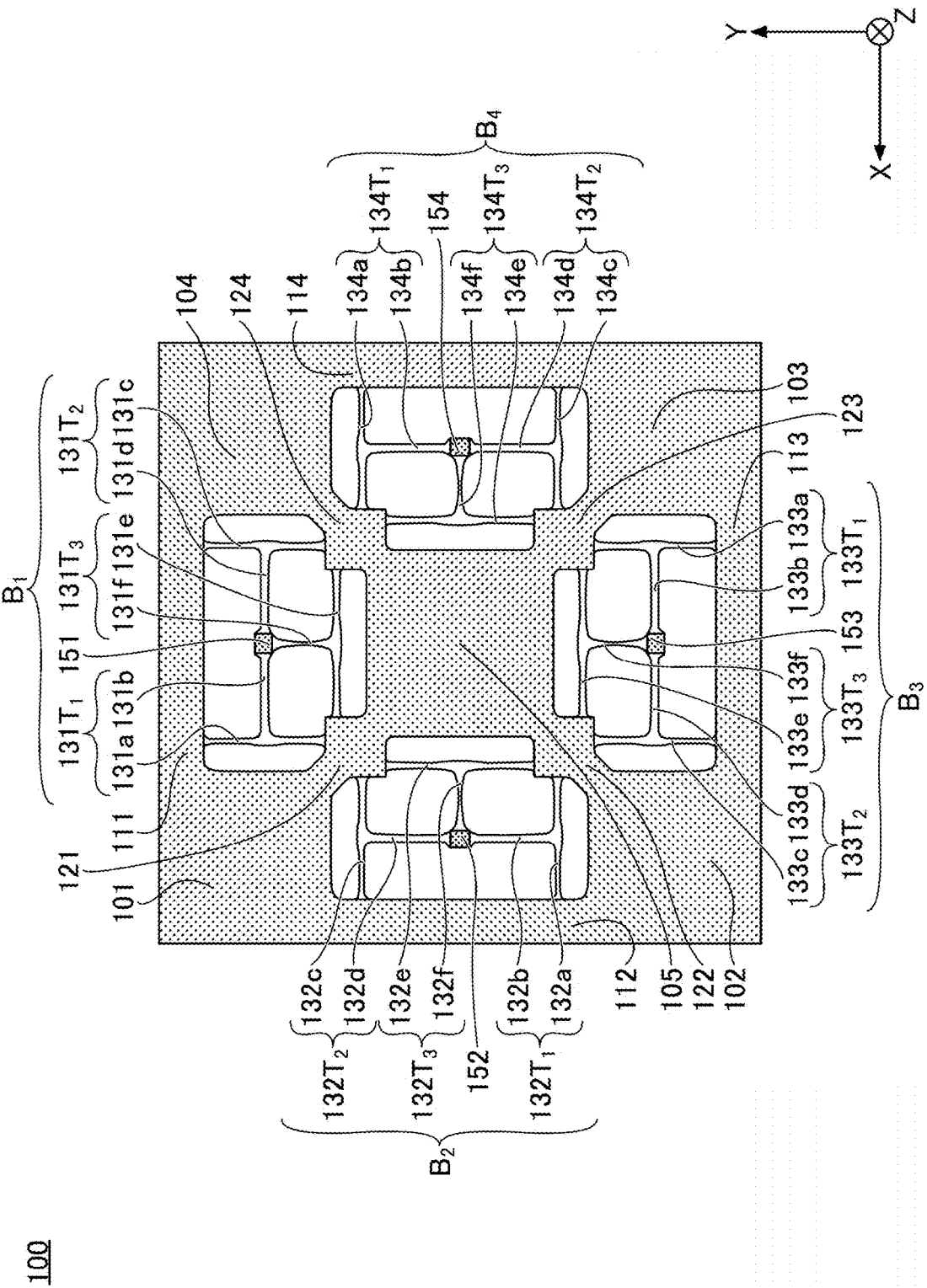
FIG. 8 is a bottom view of the sensor chip 100 when viewed in the negative Z-axis direction.

FIG. 5 is a perspective view of the sensor chip 100 when viewed in the positive Z-axis direction. FIG. 6 is a plan view of the sensor chip 100 when viewed in the positive Z-axis direction. FIG. 7 is a perspective view of the sensor chip 100 when viewed in the negative Z-axis direction. FIG. 8 is a bottom view of the sensor chip 100 when viewed in the negative Z-axis direction. In FIG. 8, for the sake of convenience, surfaces at the same height are illustrated in the same crepe pattern. In this description, a direction parallel to one side of the top surface of the sensor chip 100 refers to the X-axis direction, a direction perpendicular to the one side of the top surface of the sensor chip 100 refers to the Y-axis direction, and a thickness direction (direction normal to the top surface of the sensor chip 100) of the sensor chip 100 refers to the Z-axis direction. The X-axis direction, the Y-axis direction, and the Z-axis direction are mutually perpendicular.

The sensor chip 100 illustrated in FIGS. 5 to 8 is a microelectromechanical systems (MEMS) sensor chip that is one chip and can detect up to six axes. The sensor chip 100 is formed of a semiconductor substrate such as a silicon on insulator (SOI) substrate. The planar shape of the sensor chip 100 can be, for example, an approximate 7000 μm per side rectangle (square or rectangle).

The sensor chip 100 includes five columnar supports 101 to 105. The planar shape of each of the supports 101 to 105 can be, for example, an approximate 2000 μm per side square. The supports 101 to 104 are respectively disposed at four corners of the rectangular sensor chip 100. The support 105 is disposed on a central portion of the rectangular sensor chip 100. Each of the supports 101 to 104 is a representative example of a first support, and the support 105 is a representative example of a second support.

A frame 112 (for coupling supports that are next to each other), of which both ends are fixed by the support 101 and the support 102, is provided between the support 101 and the support 102. A frame 113 (for coupling supports that are next to each other), of which both ends are fixed by the support 102 and the support 103, is provided between the support 102 and the support 103.

A frame 114 (for coupling supports that are next to each other), of which both ends are fixed by the support 103 and the support 104, is provided between the support 103 and the support 104. A frame 111 (for coupling supports that are next to each other), of which both ends are fixed by the support 104 and the support 101, is provided between the support 104 and the support 101.

In other words, four frames 111, 112, 113, and 114 are formed as a structural frame of the sensor chip 100, and the supports 101, 102, 103, and 104 are each disposed at a corner at which given frames are coupled to each other.

An internal corner of the support 101 and a corner of the support 105 facing the internal corner of the support 101 are coupled by a coupling portion 121. An internal corner of the support 102 and a corner of the support 105 facing the internal corner of the support 102 are coupled by a coupling portion 122.

An internal corner of the support 103 and a corner of the support 105 facing the internal corner of the support 103 are coupled by a coupling portion 123. An internal corner of the support 104 and a corner of the support 105 facing the internal corner of the support 104 are coupled by a coupling portion 124.

In such a manner, the sensor chip 100 includes the coupling portions 121 to 124 each of which couples the support 105 and a given support among the supports 101 to 104. The coupling portions 121 to 124 are each disposed diagonally relative to the X-axis direction (Y-axis direction). The coupling portions 121 to 124 are respectively disposed so as not to be parallel to the frames 111, 112, 113, and 114.

The supports 101 to 105, the frames 111 to 114, and the coupling portions 121 to 124 can be each formed of, for example, an active layer, a BOX layer, and a support layer of the SOI substrate. The thickness of each of those layers can be, for example, in the range of about 400 μm to about 600 μm.

The sensor chip 100 has four sensing blocks $B_1$ to $B_4$. Each sensing block includes three T-patterned beam structures in each of which piezoresistive elements being strain-detecting elements are disposed. The T-patterned beam structure refers to a structure that includes a first detection beam and a second detection beam that extends from a middle portion of the first detection beam in a direction perpendicular to the first detection beam.

A detection beam refers to a beam capable of placing a piezoresistive element, but it is not necessarily need to place the piezoresistive element. That is, although the detection beam is capable of detecting forces and moments by placing piezoresistive elements, the sensor chip 100 may have a detection beam that is not positioned with piezoresistive elements and is not used for detecting forces and moments.

Specifically, the sensing block $B_1$ includes T-patterned beam structures $131T_1$, $131T_2$, and $131T_3$. The sensing block $B_2$ includes T-patterned beam structures $132T_1$, $132T_2$, and $132T_3$. The sensing block $B_3$ includes T-patterned beam structures $133T_1$, $133T_2$, and $133T_3$. The sensing block $B_4$ includes T-patterned beam structures $134T_1$, $134T_2$, and $134T_3$. The beam structure will be described below in more details.

In the sensing block $B_1$, in a plan view, a first detection beam 131a is provided parallel to a side of the support 104 toward the support 101 so as to be at a predetermined distance from the side of the support 104. The first detection beam 131a extends between the frame 111 toward the support 101 and the coupling portion 121 toward the support 105. A second detection beam 131b is provided such that one end of the second detection beam is coupled at a middle portion of the first detection beam 131a in a longitudinal direction of the first detection beam. The second detection beam 131b extends toward the support 104 in a direction perpendicular to the longitudinal direction of the first detection beam 131a. The first detection beam 131a and the second detection beam 131b constitute the T-patterned beam structure $131T_1$.

In a plan view, a first detection beam 131c is provided parallel to a side of the support 104 toward the support 101 so as to be at a predetermined distance from the side of the support 104. The first detection beam 131c extends between the coupling portion 111 toward the support 104 and the coupling portion 124 toward the support 105. A second detection beam 131d is provided such that one end of the second detection beam is coupled at a middle portion of the first detection beam 131c in a longitudinal direction of the first detection beam. The second detection beam 131d extends toward the support 101 in a direction perpendicular to the longitudinal direction of the first detection beam 131c. The first detection beam 131c and the second detection beam 131d constitute the T-patterned beam structure $131T_2$.

In a plan view, a first detection beam 131e is provided parallel to a side of the support 105 toward the frame 111 so as to be at a predetermined distance from the side of the support 105. The first detection beam 131*e* extends between the coupling portion 121 toward the support 105 and the coupling portion 124 toward the support 105. A second detection beam 131*f* is provided such that one end of the second detection beam is coupled at a middle portion of the first detection beam 131*e* in a longitudinal direction, and the second detection beam 131*f* extends toward the frame 111 in a direction perpendicular to the longitudinal direction of the first detection beam 131*e*. The first detection beam 131*e* and the second detection beam 131*f* constitute the T-patterned beam structure 131T$_3$.

Another end of the second detection beam 131*b*, another end of the second detection beam 131*d*, and another end of the second detection beam 131*f* are connected to one another to thereby form a connection portion 141. A force point portion 151 is provided at the bottom surface of the connection portion 141. The force point portion 151 has, for example, a rectangular prismatic shape. The T-patterned beam structures 131T$_1$, 131T$_2$, and 131T$_3$, the connection portion 141, and the force point portion 151 constitute the sensing block B$_1$.

In the sensing block B$_1$, the first detection beam 131*a*, the first detection beam 131*c*, and the second detection beam 131*f* are parallel to one another. Also, the second detection beams 131*b* and 131*d*, and the first detection beam 131*e* are parallel to one another. The thickness of each detection beam in the sensing block B$_1$ can be, for example, in the range of about 30 μm to about 50 μm.

In the sensing block B$_2$, in a plan view, a first detection beam 132*a* is provided parallel to a side of the support 102 toward the support 101 so as to be at a predetermined distance from the side of the support 102. The first detection beam 132*a* extends between the frame 112 toward the support 102 and the coupling portion 122 toward the support 105. A second detection beam 132*b* is provided such that one end of the second detection beam is coupled at a middle portion of the first detection beam 132*a* in a longitudinal direction of the first detection beam. The second detection beam 132*b* extends toward the support 101 in a direction perpendicular to the longitudinal direction of the first detection beam 132*a*. The first detection beam 132*a* and the second detection beam 132*b* constitute the T-patterned beam structure 131T$_1$.

In a plan view, a first detection beam 132*c* is provided parallel to a side of the support 101 toward the support 102 so as to be at a predetermined distance from the side of the support 101. The first detection beam 132*c* extends between the frame 112 toward the support 101 and the coupling portion 121 toward the support 105. A second detection beam 132*d* is provided such that one end of the second detection beam is coupled at a middle portion of the first detection beam 132*c* in a longitudinal direction of the first detection beam. The second detection beam 132*d* extends toward the support 102 in a direction perpendicular to the longitudinal direction of the first detection beam 132*c*. The first detection beam 132*c* and the second detection beam 132*d* constitute the T-patterned beam structure 132T$_2$.

In a plan view, a first detection beam 132*e* is provided parallel to a side of the support 105 toward the frame 112 so as to be at a predetermined distance from the side of the support 105. The first detection beam 132*e* extends between the coupling portion 122 toward the support 105 and the coupling portion 121 toward the support 105. A second detection beam 132*f* is provided such that one end of the second detection beam is coupled at a middle portion of the first detection beam 132*e* in a longitudinal direction, and the second detection beam 132*f* extends toward the frame 112 so as to be perpendicular to the longitudinal direction of the first detection beam 132*e*. The first detection beam 132*e* and the second detection beam 132*f* constitute the T-patterned beam structure 132T$_3$.

Another end of the second detection beam 132*b*, another end of the second detection beam 132*d*, and another end of the second detection beam 132*f* are connected to one another to thereby form a connection portion 142. A force point portion 152 is provided at the bottom surface of the connection portion 142. The force point portion 152 has, for example, a rectangular prismatic shape. The T-patterned beam structures 132T$_1$, 132T$_2$, and 132T$_3$, the connection portion 142, and the force point portion 152 constitute the sensing block B$_2$.

In the sensing block B$_2$, the first detection beam 132*a*, the first detection beam 132*c*, and the second detection beam 132*f* are parallel to one another. Also, the second detection beams 132*b* and 132*d*, and the first detection beam 132*e* are parallel to one another. The thickness of each detection beam in the sensing block B$_2$ may be, for example, in the range of about 30 μm to about 50 μm.

In the sensing block B$_3$, in a plan view, a first detection beam 133*a* is provided parallel to a side of the support 103 toward the support 102 so as to be at a predetermined distance from the side of the support 103. The first detection beam 133*a* extends between the frame 113 toward the support 103 and the coupling portion 123 toward the support 105. A second detection beam 133*b* is provided such that one end of the second detection beam is coupled at a middle portion of the first detection beam 133*a* in a longitudinal direction of the first detection beam. The second detection beam 133*b* extends toward the support 102 in a direction perpendicular to the longitudinal direction of the first detection beam 133*a*. The first detection beam 133*a* and the second detection beam 133*b* constitute the T-patterned beam structure 133T$_1$.

In a plan view, a first detection beam 133*c* is provided parallel to a side of the support 102 toward the support 103 so as to be at a predetermined distance from the side of the support 102. The first detection beam 133*c* extends between the frame 113 toward the support 102 and the coupling portion 122 toward the support 105. A second detection beam 133*d* is provided such that one end of the second detection beam is coupled at a middle portion of the first detection beam 133*c* in a longitudinal direction, and the second detection beam 132*d* extends toward the support 103 so as to be perpendicular to the longitudinal direction of the first detection beam 133*c*. The first detection beam 133*c* and the second detection beam 133*d* constitute the T-patterned beam structure 132T$_2$.

In a plan view, a first detection beam 131*e* is provided parallel to a side of the support 105 toward the frame 113 so as to be at a predetermined distance from the side of the support 105. The first detection beam 131*e* extends between the coupling portion 123 toward the support 105 and the coupling portion 122 toward the support 105. A second detection beam 133*f* is provided such that one end of the second detection beam is coupled at a middle portion of the first detection beam 133*e* in a longitudinal direction, and the second detection beam 133*f* extends toward the frame 113 so as to be perpendicular to the longitudinal direction of the first detection beam 133*e*. The first detection beam 133*e* and the second detection beam 133*f* constitute the T-patterned beam structure 131T$_3$.

Another end of the second detection beam 133*b*, another end of the second detection beam 133*d*, and another end of the second detection beam 133f are connected to one another to thereby form a connection portion 143. A force point portion 153 is provided at the bottom surface of the connection portion 143. The force point portion 153 has, for example, a rectangular prismatic shape. The T-patterned beam structures 133T$_1$, 133T$_2$, and 133T$_3$, the connection portion 143, and the force point portion 153 constitute the sensing block B$_3$.

In the sensing block B$_3$, the first detection beam 133a, the first detection beam 133c, and the second detection beam 133f are parallel to one another. Also, the second detection beams 133b and 133d, and the first detection beam 133e are parallel to one another. The thickness of each detection beam in the sensing block B$_3$ may be, for example, in the range of about 30 µm to about 50 µm.

In the sensing block B$_4$, in a plan view, a first detection beam 134a is provided parallel to a side of the support 104 toward the support 103 so as to be at a predetermined distance from the side of the support 104. The first detection beam 134a extends between the frame 114 toward the support 104 and the coupling portion 124 toward the support 105. A second detection beam 134b is provided such that one end of the second detection beam is coupled at a middle portion of the first detection beam 134a in a longitudinal direction of the first detection beam. The second detection beam 134b extends toward the support 103 in a direction perpendicular to the longitudinal direction of the first detection beam 134a. The first detection beam 134a and the second detection beam 134b constitute the T-patterned beam structure 134T$_1$.

In a plan view, a first detection beam 134c is provided parallel to a side of the support 103 toward the support 104 so as to be at a predetermined distance from the side of the support 103. The first detection beam 134c extends between the frame 114 toward the support 103 and the coupling portion 123 toward the support 105. A second detection beam 134d is provided such that one end of the second detection beam is coupled at a middle portion of the first detection beam 134c in a longitudinal direction of the first detection beam. The second detection beam 134d extends toward the support 104 in a direction perpendicular to the longitudinal direction of the first detection beam 134c. The first detection beam 134c and the second detection beam 134d constitute the T-patterned beam structure 134T$_2$.

In a plan view, a first detection beam 134e is provided parallel to a side of the support 105 toward the frame 114 so as to be at a predetermined distance from the side of the support 105. The first detection beam 134e extends between the coupling portion 124 toward the support 105 and the coupling portion 123 toward the support 105. A second detection beam 134f is provided such that one end of the second detection beam is coupled at a middle portion of the first detection beam 134e in a longitudinal direction, and the second detection beam 134f extends toward the frame 114 so as to be perpendicular to the longitudinal direction of the first detection beam 134e. The first detection beam 134e and the second detection beam 134f constitute the T-patterned beam structure 134T$_3$.

Another end of the second detection beam 134b, another end of the second detection beam 134d, and another end of the second detection beam 134f are connected to one another to thereby form a connection portion 144. A force point portion 154 is provided at the bottom surface of the connection portion 144. The force point portion 154 has, for example, a rectangular prismatic shape. The T-patterned beam structures 134T$_1$, 134T$_2$, and 134T$_3$, the connection portion 144, and the force point portion 154 constitute the sensing block B$_4$.

In the sensing block B$_4$, the first detection beam 134a, the first detection beam 134c, and the second detection beam 134f are parallel to one another. Also, the second detection beams 134b and 134d, and the first detection beam 134e are parallel to one another. The thickness of each detection beam in the sensing block B$_4$ may be, for example, in the range of about 30 µm to about 50 µm.

Thus, the sensor chip 100 includes the four sensing blocks (sensing blocks B$_1$ to B$_4$). Each sensing block is disposed in a region surrounded by given supports that are next to each other and are among the supports 101 to 104, a given frame and a given coupling portion each of which couples the given supports that are next to each other, and the support 105. In a plan view, for example, given sensing blocks can be disposed to be point-symmetric with respect to the center of the sensor chip.

Each sensing block includes three T-patterned beam structures. In each sensing block, three T-patterned beam structures include two T-patterned beam structures in which, in a plan view, a given connection portion is interposed between first detection beams that are respectively included in two T-patterned beam structures and are disposed parallel to each other. The three T-patterned beam structures also include one T-patterned beam structure including a first detection beam that is disposed parallel to second detection beams included in the respective two T-patterned beam structures. The first detection beam in the one T-patterned beam structure is disposed between the given connection portion and the support 105.

For example, in the sensing block B$_1$, three T-patterned beam structures include T-patterned beam structures 131T$_1$ and 131T$_2$ in which, in a plan view, the connection portion 141 is interposed between the first detection beam 131a and the first detection beam 131c that are disposed parallel to each other. The three T-patterned beam structures also include the T-patterned beam structure 131T$_3$ including the first detection beam 131e that is disposed parallel to the second detection beams 131b and 131d included in the respective T-patterned beam structures 131T$_1$ and 131T$_2$. The first detection beam 131e in the T-patterned beam structure 131T$_3$ is disposed between the connection portion 141 and the support 105. The structure in each of the sensing blocks B$_2$ to B$_4$ is similar to that in the sensing block B$_1$.

Each of the force point portions 151 to 154 is a point to which an external force is applied. Each force point portion can be formed of, for example, a BOX layer and a support layer in the SOI substrate. The bottom surface of each of the force point portions 151 to 154 substantially corresponds to the bottom surface of a corresponding support among the supports 101 to 105.

In such a manner, when a force or displacement is obtained through each of the four force point portions 151 to 154, a given beam deforms so as to differ according to a force types, thereby providing a sensor with greater isolation of 6 axes. The number of force point portions is the same as the number of positions of the strain inducing body to which displacements are input.

One or more internal corners of the sensor chip 100 are preferably R-shaped in order to suppress stress concentration.

The supports 101 to 105 in the sensor chip 100 are connected to a non-movable portion in the strain inducing body 200, and the force point portions 151 to 154 are connected to a movable portion of the strain inducing body

200. Even if the movable portion and non-movable portion are reversed with respect to each other, the sensor chip 100 functions as a force sensor device. That is, the supports 101 to 105 in the sensor chip 100 are connected to the movable portion of the strain inducing body 200, and the force point portions 151 to 154 may be connected to the non-movable portion of the strain inducing body 200.

Figure 9:
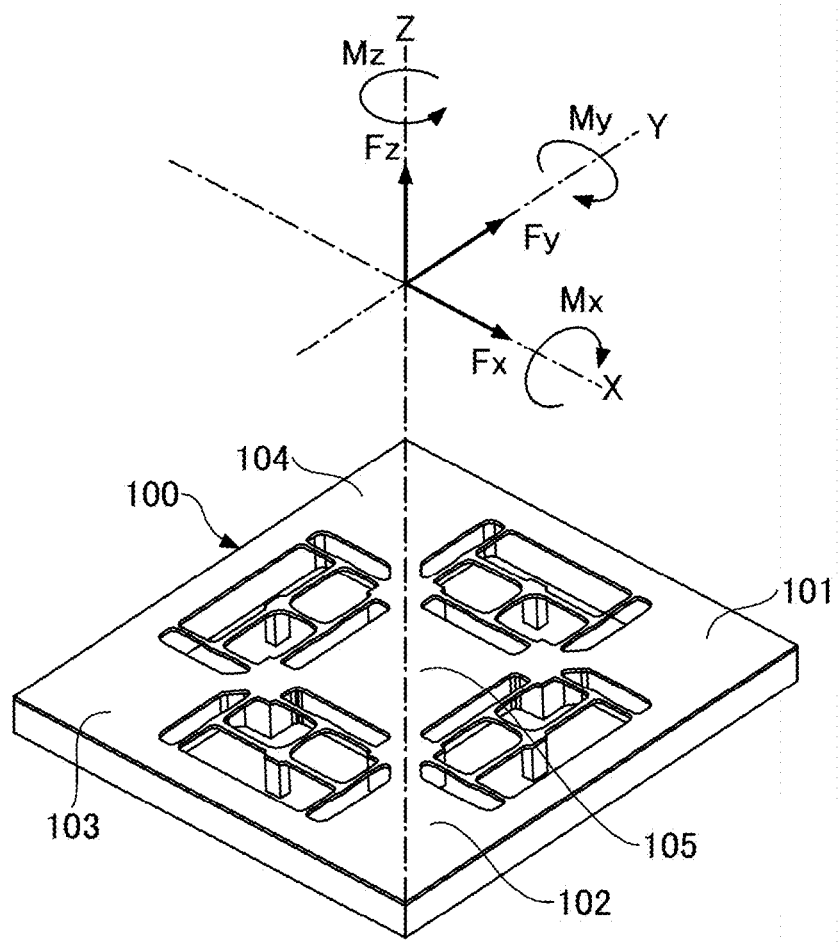
FIG. 9 is a diagram for describing signs for forces and moments applied to axes.

FIG. 9 is a diagram for describing signs for forces and moments applied to axes. As illustrated in FIG. 9, the force in the X-axis direction is expressed by Fx, the force in the Y-axis direction is expressed by Fy, and the force in the Z-axis direction is expressed by Fz. Also, the moment to cause rotation about the X-axis as an axis is expressed by Mx, the moment to cause rotation about the Y-axis as an axis is expressed by My, and the moment to cause rotation about the Z-axis as an axis is expressed by Mz.

Figure 10:
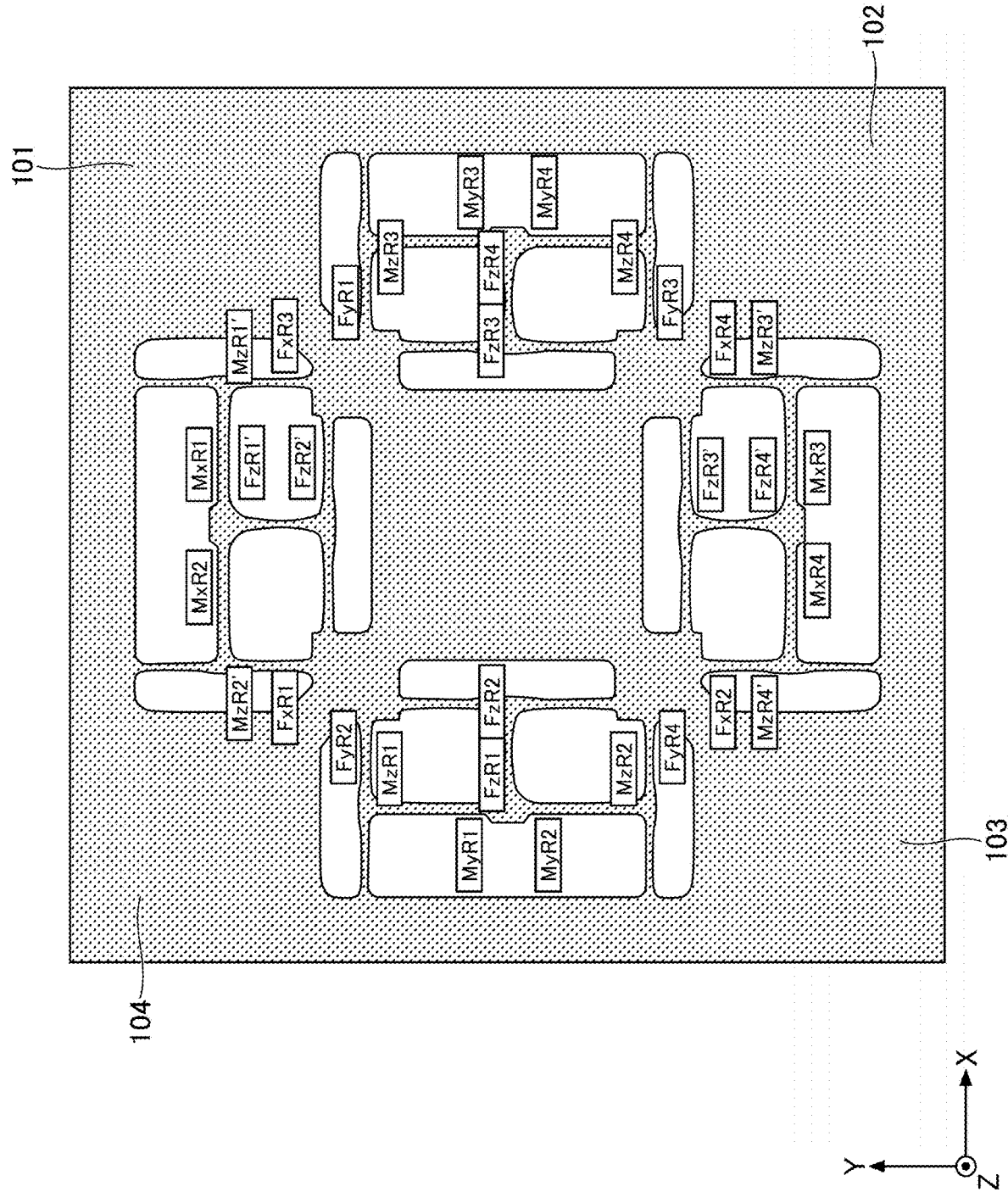
FIG. 10 is a diagram illustrating an example of the arrangement of piezoresistive elements of the sensor chip 100.
Figure 11:
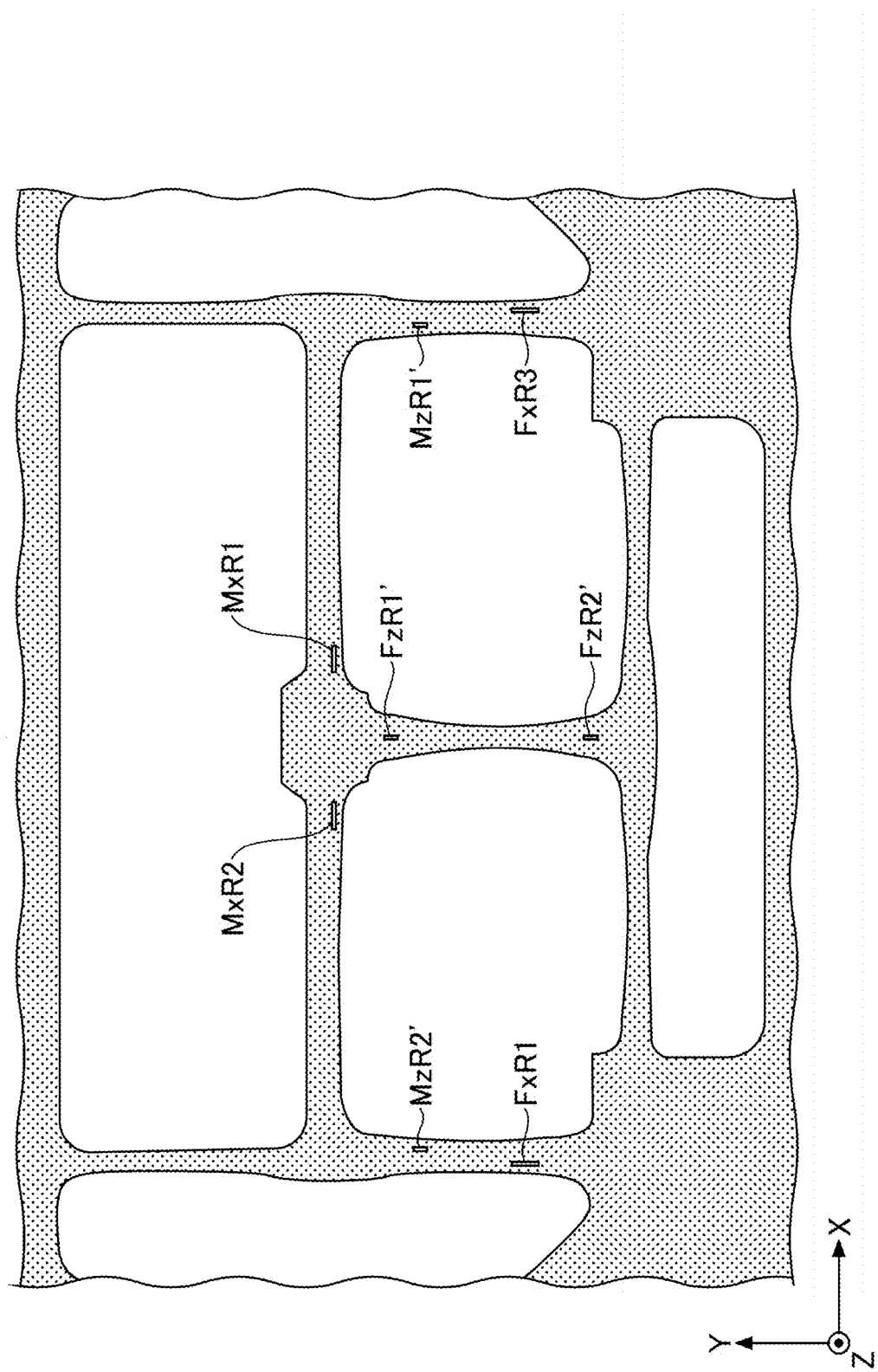
FIG. 11 is a partial enlarged view of the sensor chip in one sensing block illustrated in FIG. 10.

FIG. 10 is a diagram illustrating the arrangement of piezoresistive elements in the sensor chip 100. FIG. 11 is an enlarged partial view of one sensing block in the sensor chip illustrated in FIG. 10. As illustrated in FIG. 10 and FIG. 11, piezoresistive elements are each disposed at a predetermined location of a given sensing block corresponding to a force point portion among the four force point portions 151 to 154. The arrangement of the piezoresistive elements in each of the other sensing blocks illustrated in FIG. 10 is the same as that of the piezoresistive elements in the sensing block illustrated in FIG. 11.

Referring to FIGS. 5 to 8, FIG. 10, and FIG. 11, in the sensing block $B_1$ that includes the connection portion 141 and the force point portion 151, a piezoresistive element MzR1' is disposed at a portion of the first detection beam 131a that is toward the second detection beam 131b and is between the second detection beam 131b and the first detection beam 131e. A piezoresistive element FxR3 is disposed at a portion of the first detection beam 131a that is toward the first detection beam 131e and is between the second detection beam 131b and the first detection beam 131e. A piezoresistive element MxR1 is disposed on the second detection beam 131b toward the connection portion 141.

A piezoresistive element MzR2' is disposed at a portion of the first detection beam 131c that is toward the second detection beam 131d and is between the second detection beam 131d and the first detection beam 131e. A piezoresistive element FxR1 is disposed at a portion of the first detection beam 131c that is toward the first detection beam 131e and is between the second detection beam 131d and the first detection beam 131e. A piezoresistive element MxR2 is disposed on the second detection beam 131d toward the connection portion 141.

A piezoresistive element FzR1' is disposed on the second detection beam 131f toward the connection portion 141. A piezoresistive element FzR2' is disposed on the second detection beam 131f toward the first detection beam 131e. The piezoresistive elements MzR1', FxR3, MxR1, MzR2', FxR1, and MxR2 are each disposed at a location apart from a middle portion of a corresponding detection beam in a longitudinal direction.

In the sensing block $B_2$ that includes the connection portion 142 and the force point portion 152, a piezoresistive element MzR4 is disposed at a portion of the first detection beam 132a that is toward the second detection beam 132b and is between the second detection beam 132b and the first detection beam 132e. A piezoresistive element FyR3 is disposed at a portion of the first detection beam 132a that is toward the first detection beam 132e and is between the second detection beam 132b and the first detection beam 132e. A piezoresistive element MyR4 is disposed on the second detection beam 132b toward the connection portion 142.

A piezoresistive element MzR3 is disposed at a portion of the first detection beam 132c that is toward the second detection beam 132d and is between the second detection beam 132d and the first detection beam 132e. A piezoresistive element FyR1 is disposed at a portion of the first detection beam 132c that is toward the first detection beam 132e and is between the second detection beam 132d and the first detection beam 132e. A piezoresistive element MyR3 is disposed on the second detection beam 132d toward the connection portion 142.

A piezoresistive element FzR4 is disposed on the second detection beam 132f toward the connection portion 142. A piezoresistive element FzR3 is disposed on the second detection beam 132f toward the first detection beam 132e. The piezoresistive elements MzR4, FxR3, MyR4, MzR3, FyR1, and MyR3 are each disposed at a location apart from a middle portion of a corresponding detection beam in a longitudinal direction.

In the sensing block $B_3$ that includes the connection portion 143 and the force point portion 153, a piezoresistive element MzR4' is disposed at a portion of the first detection beam 133a that is toward the second detection beam 133b and is between the second detection beam 133b and the first detection beam 133e. A piezoresistive element FxR2 is disposed at a portion of the first detection beam 133a that is toward the first detection beam 133e and is between the second detection beam 133b and the first detection beam 133e. A piezoresistive element MxR4 is disposed on the second detection beam 133b toward the connection portion 143.

A piezoresistive element MzR3' is disposed at a portion of the first detection beam 133c that is toward the second detection beam 133d and is between the second detection beam 133d and the first detection beam 133e. A piezoresistive element FxR4 is disposed at a portion of the first detection beam 133c that is toward the first detection beam 133e and is between the second detection beam 133d and the first detection beam 133e. A piezoresistive element MxR3 is disposed on the second detection beam 133d toward the connection portion 143.

A piezoresistive element FzR4' is disposed on the second detection beam 133f toward the connection portion 143. A piezoresistive element FzR3' is disposed on the second detection beam 133f toward the first detection beam 133e. The piezoresistive elements MzR4', FxR2, MxR4, MzR3', FxR4, and MxR3 are each disposed at a location apart from a middle portion of a corresponding detection beam in a longitudinal direction.

In the sensing block $B_4$ that includes the connection portion 144 and the force point portion 154, a piezoresistive element MzR1 is disposed at a portion of the first detection beam 134a that is toward the second detection beam 134b and is between the second detection beam 134b and the first detection beam 134e. A piezoresistive element FyR2 is disposed at a portion of the first detection beam 134a that is toward the first detection beam 134e and is between the second detection beam 134b and the first detection beam 134e. A piezoresistive element MyR1 is disposed on the second detection beam 134b toward the connection portion 144.

A piezoresistive element MzR2 is disposed at a portion of the first detection beam 134c that is toward the second detection beam 134d and is between the second detection beam 134d and the first detection beam 134e. A piezoresistive element FyR4 is disposed at a portion of the first detection beam 134c that is toward the first detection beam 134e and is between the second detection beam 134d and the first detection beam 134e. A piezoresistive element MyR2 is disposed on the second detection beam 134d toward the connection portion 144.

A piezoresistive element FzR1 is disposed on the second detection beam 134f toward the connection portion 144. A piezoresistive element FzR2 is disposed on the second detection beam 134f toward the first detection beam 134e. The piezoresistive elements MzR1, FxR2, MyR1, MzR2, FzR4, and MyR2 are each disposed at a location apart from a middle portion of a corresponding detection beam in a longitudinal direction.

In such a manner, in the sensor chip 100, each of the sensing blocks individually includes multiple piezoresistive elements. With this arrangement, when inputs are respectively applied to the force point portions 151 to 154, the sensor chip 100 can detect up to six axes relating to forces in predetermined axis-directions or moments about respective predetermined axes, based on changes in the outputs of multiple piezoresistive elements on given beams.

In addition to the piezoresistive elements used to detect strain, one or more dummy piezoresistive elements may be disposed in the sensor chip 100. The dummy piezoresistive elements are used to adjust variations in stress against detection beams or resistance of a bridge circuit. For example, all piezoresistive elements including piezoresistive elements used to detect strain are arranged so as to be point-symmetrical with respect to the center of the support 105.

In the sensor chip 100, each piezoresistive element among multiple piezoresistive elements to detect the displacement in the X-axis direction and the displacement in the Y-axis direction is disposed on the first detection beam included in a given T-patterned beam structure, and further, each piezoresistive element among multiple piezoresistive elements to detect the displacement in the Z-axis direction is disposed on the second detection beam included in a given T-patterned beam structure. Furthermore, each piezoresistive element among multiple piezoresistive elements to detect moments about the Z-axis direction is disposed on the first detection beam included in a given T-patterned beam structure, and further, each piezoresistive element among multiple piezoresistive elements to detect moments about the X-axis direction and the Y-axis direction is disposed on the second detection beam included in a given T-patterned beam structure.

Each of the piezoresistive elements FxR1 to FxR4 detects the force Fx, each of the piezoresistive elements FyR1 to FyR4 detects the force Fy, and each of the piezoresistive elements FzR1 to FzR4 and FzR1' to FzR4' detects the force Fz. Also, each of the piezoresistive elements MxR1 to MxR4 detects the moment Mx, each of the piezoresistive elements MyR1 to MyR4 detects the moment My, and each of the piezoresistive elements MzR1 to MzR4 and MzR1' to MzR4' detects the moment Mz.

In such a manner, in the sensor chip 100, each of the sensing blocks individually includes multiple piezoresistive elements. With this arrangement, when forces or displacements are respectively applied (transmitted) to the force point portions 151 to 154, the sensor chip 100 can detect up to six axes relating to forces in predetermined directions or moments about the respective directions (axis-directions), based on changes in the outputs of multiple piezoresistive elements on given beams. By changing the thickness and width of each detection beam, equalization of detection sensitivity, increases in detection sensitivity, or the like can be controlled.

By reducing the number of piezoresistive elements, a sensor chip for detecting five axes or less relating to displacements in predetermined axis directions can be provided.

Figure 12:
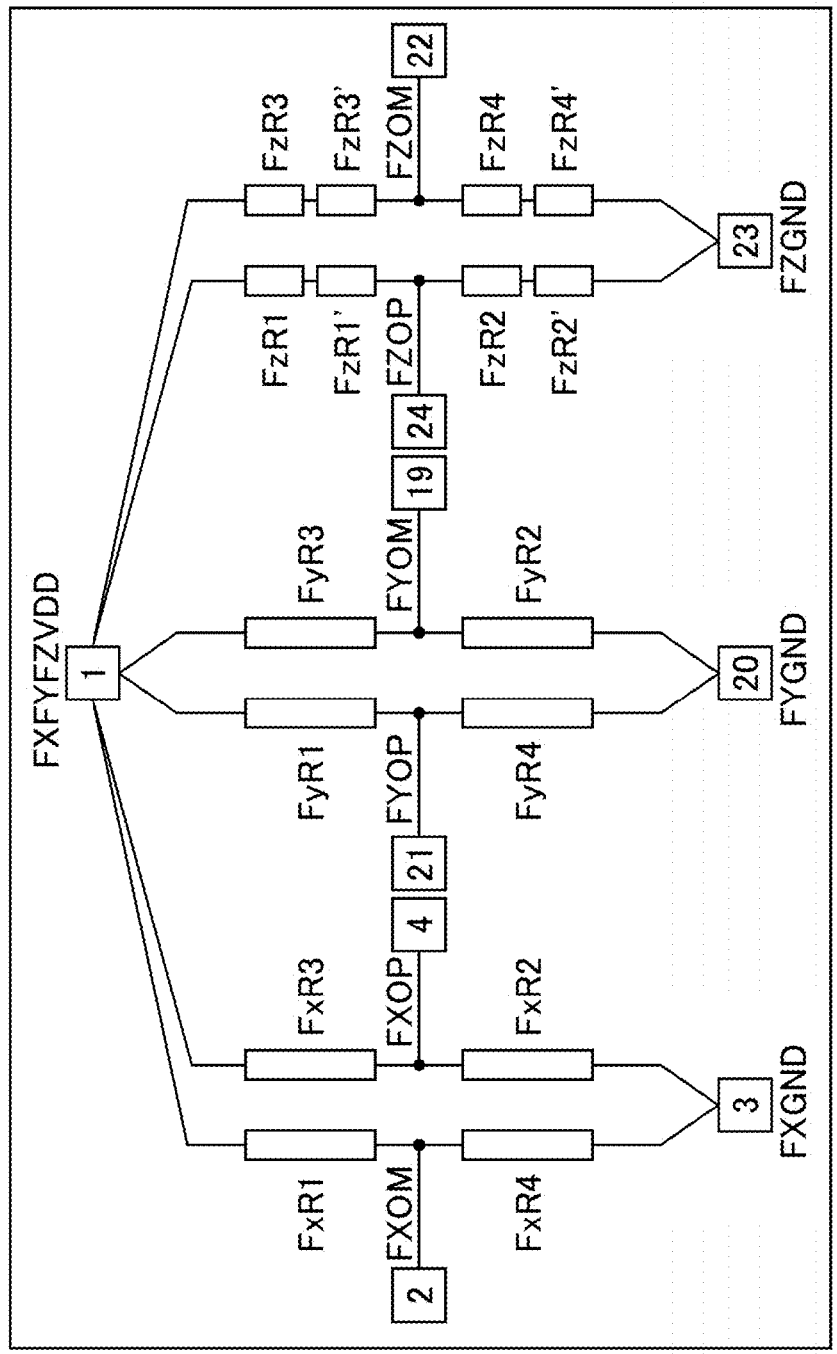
FIG. 12 illustrates a diagram (first part) illustrating an example of a detecting circuit that uses piezoresistive elements.
Figure 13:
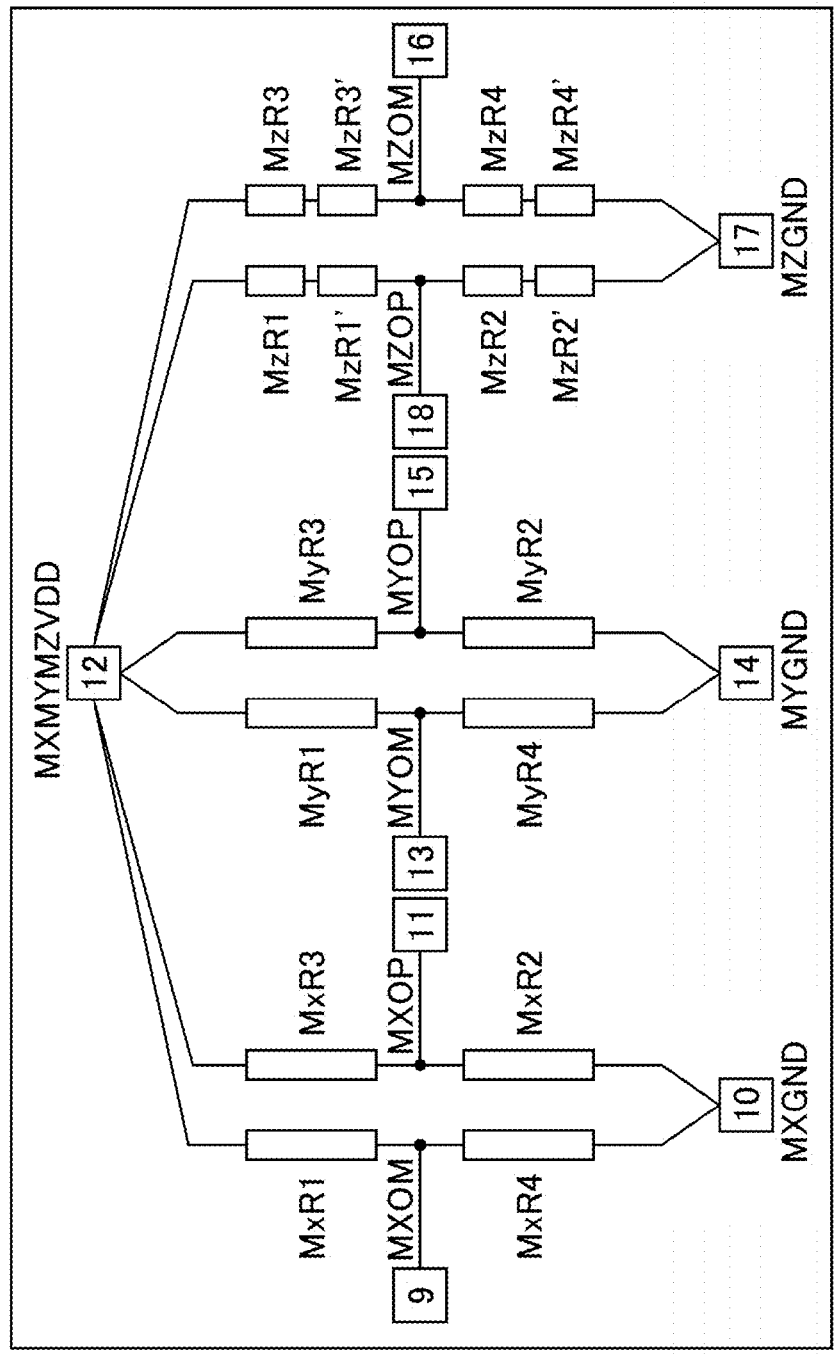
FIG. 13 illustrates a diagram (second part) illustrating an example of the detecting circuit that uses piezoresistive elements.

In the sensor chip 100, for example, a detecting circuit described below can be used to detect forces and moments. Each of FIG. 12 and FIG. 13 illustrates an example of the detecting circuit that uses piezoresistive elements. In each of FIG. 12 and FIG. 13, numbers rounded with squares indicate external output terminals. For example, the number "1" indicates a power supply terminal for a Fx-axis, a Fy-axis, and a Fz-axis. The number "2" is a negative output terminal for the Fx-axis. The number "3" indicates a GND terminal for the Fx-axis, and the number "4" indicates a positive output terminal for the Fx-axis. The number "19" indicates a negative output terminal for the Fy-axis, the number "20" indicates a GND terminal for the Fy-axis, and the number "21" indicates a positive output terminal for the Fy-axis. The number "22" indicates a negative output terminal for the Fz-axis, the number "23" indicates a GND terminal for the Fz-axis, and the number "24" indicates a positive output terminal for the Fz-axis.

The number "9" indicates a negative terminal for the Mx-axis, the number "10" indicates a GND terminal for the Mx-axis, and the number "11" indicates a positive output terminal for the Mx-axis. The number "12" indicates a power supply terminal for the Mx-axis, My-axis, and Mz-axis. The number "13" indicates a negative output terminal for the My-axis, the number "14" indicates a GND terminal for the My-axis, and the number "15" indicates a positive output terminal for the My-axis. The number "16" indicates a negative output terminal for the Mz-axis, the number "17" indicates a GND terminal for the Mz-axis, and the number "18" indicates a positive output terminal for the Mz-axis.

Figure 14:
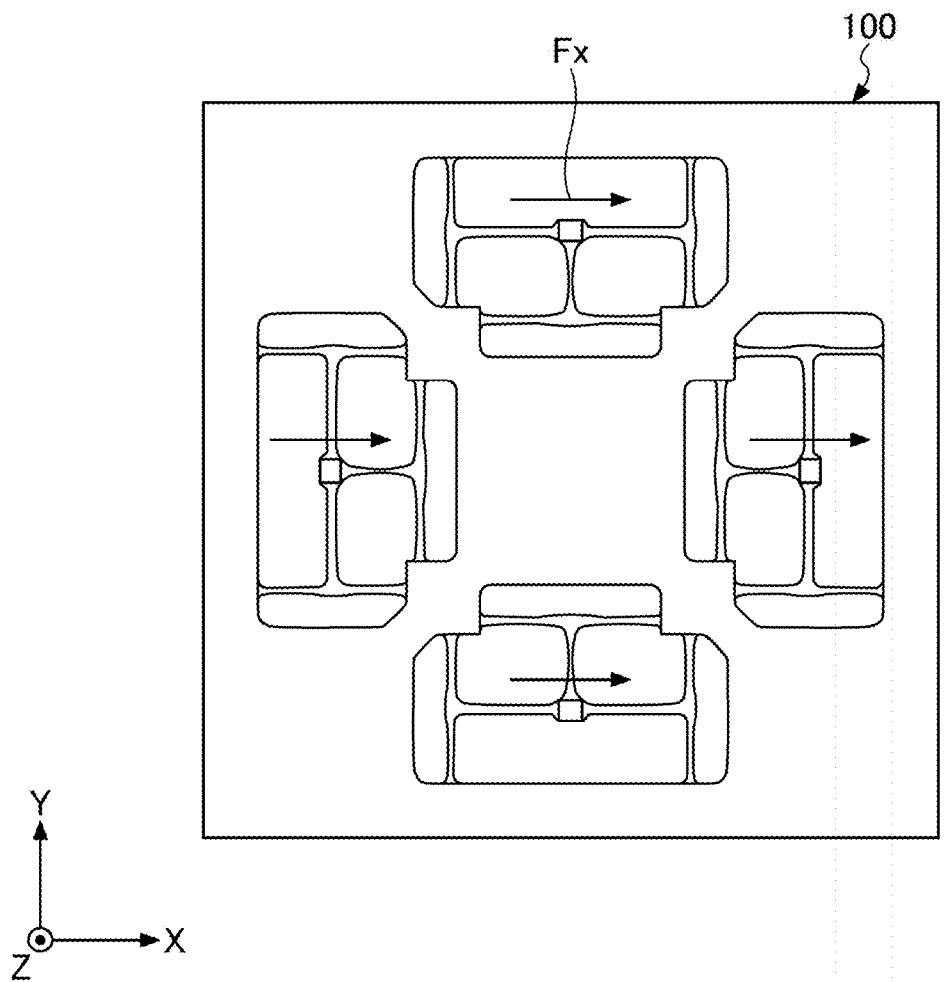
FIG. 14 is a diagram for describing an input Fx.
Figure 15:
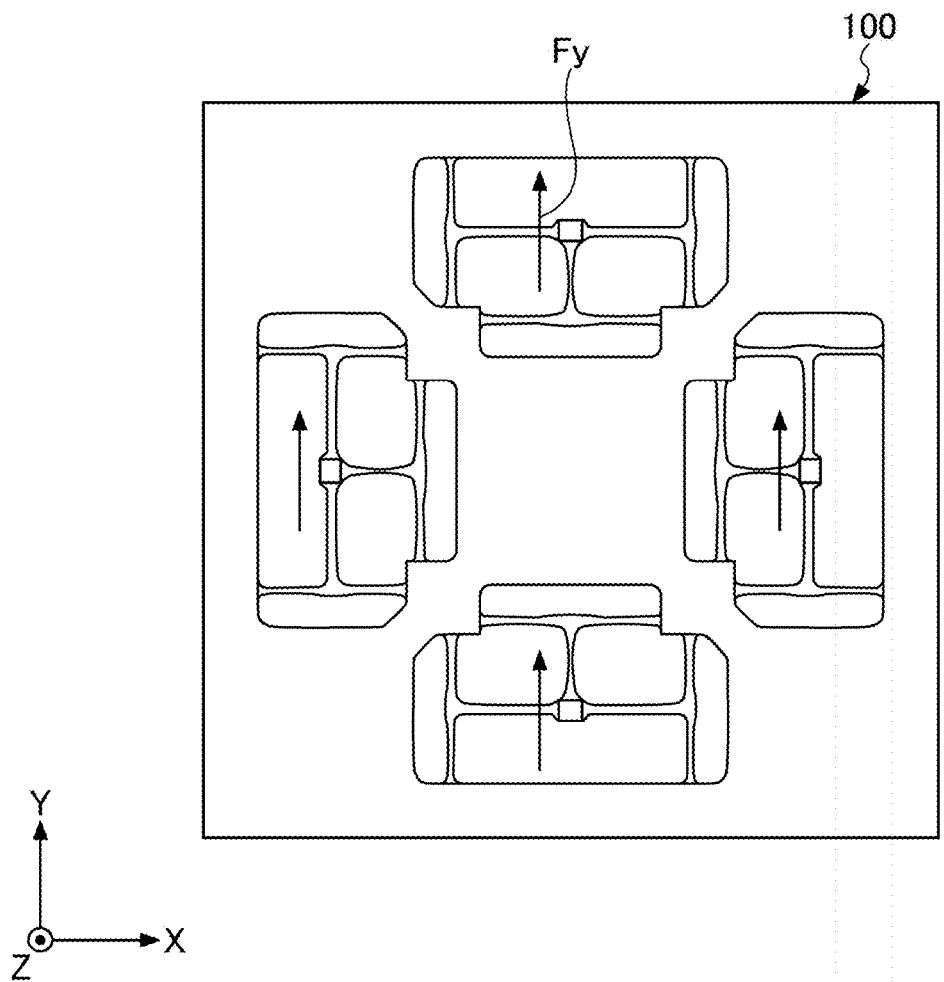
FIG. 15 is a diagram for describing an input Fy.

Hereafter, deformation of the detection beam will be described. FIG. 14 is a diagram describing an input Fx. FIG. 15 is a diagram for describing an input Fy. As illustrated in FIG. 14, when the input from the strain inducing body 200 to which the sensor chip 100 is attached is expressed by Fx, all of the four force point portions 151 to 154 attempt to move in the same direction (rightward direction in an example in FIG. 14). Similarly, as illustrated in FIG. 15, when the input from the strain inducing body 200 to which the sensor chip 100 is attached is expressed by Fy, all four force point portions 151 to 154 attempt to move in the same direction (upward direction in an example in FIG. 15). In this case, although the sensor chip 100 includes four sensing blocks, the respective force point portions in all sensing blocks move in the same direction, in accordance with displacements in the X-axis direction and Y-axis direction.

In the sensor chip 100, each T-patterned beam structure includes one or more first detection beams that are among all first detection beams in a given T-patterned beam structure and are perpendicular to a displacement direction of the input.

Beams used to detect the inputs Fx include the first detection beams 131a, 131c, 133a, and 133c. Each beam among those beams is a first detection beam in a given T-patterned beam structure, and is at a fixed distance from a given force point portion. The beams used to detect the inputs Fy include the first detection beams 132a, 132c, 134a, and 134c. Each beam among those beams is a first detection beam in a given T-patterned beam structure, and is at a distance from a given force point portion.

In response to inputs Fx and the inputs Fy, first detection beams, on which the piezoresistive elements are disposed and that are each included in a given T-patterned beam structure, deform greatly, thereby effectively detecting the input forces. Also, beams not used to detect the inputs are designed to be greatly deformable in accordance with the displacement occurring when the inputs Fx and Fy are applied. With this arrangement, even if at least one input among the input Fx and the input Fy is increased, any detection beams are not broken.

Conventional sensor chips include beams not being able to deform greatly in accordance with at least one given input among the inputs Fx and the inputs Fy. Thus, when at least one input among the input Fx and the input Fy is increased, the beams not being deformed might be broken. The sensor chip 100 can address the issue described above. That is, the sensor chip 100 can have increased fracture resistance of beams, even when displacements in various directions occur.

As described above, the sensor chip 100 includes one or more first detection beams perpendicular to the displacement direction of each input, and the one or more first detection beams perpendicular to the displacement direction can greatly deform. With this arrangement, the input Fx and the input Fy can be effectively detected. Also, even if at least one input among the input Fx and the Fy input is increased, any detection beams are not broken. As a result, the sensor chip 100 can be used for any increased rating capacity, and a measurement range and load bearing can be also improved. For example, the sensor chip 100 may have a rating capacity of 500 N, which is about 10 times greater than that of conventional chips.

In each sensing block, beams each extending in three directions in a given T-patterned beam structure are coupled to one another at a given force point portion, and deform so as to differ according to inputs. Thus, multi-axial forces can be detected more separately.

When beams are arranged in the T pattern, an increased number of paths that are each from a given beam to either a given frame or a given coupling portion is obtained. With this arrangement, a line is easily drawn to the outer periphery of the sensor chip. Therefore, layout flexibility can be improved.

In the sensor chip 100, given first detection beams, between which a given force point portion is disposed and that are among the first detection beams 131$a$, 131$c$, 132$a$, 132$c$, 133$a$, 133$c$, 134$a$, and 134$c$, greatly deform in response to the moment about the Z-axis direction. With this arrangement, piezoresistive elements can be disposed on some or all of those first detection beams.

In addition, given second detection beams, which are directly connected to a given force point portion and are among the second detection beams 131$b$, 131$d$, 131$f$, 132$b$, 132$d$, 132$f$, 133$b$, 133$d$, 133$f$, 134$b$, 134$d$, and 134$f$, mainly deform greatly in response to the displacement in the Z-axis direction. With this arrangement, piezoresistive elements can be disposed on some or all of those second detection beams.

(Strain Inducing Body 200)

As illustrated in FIG. 1 and FIG. 2, the strain inducing body 200 includes the force receiving plate 210, the strain inducing portion 220, the input transmitter 230, and the cover plate 240. Each component of the strain inducing body 200 will be described below.

Figure 16:
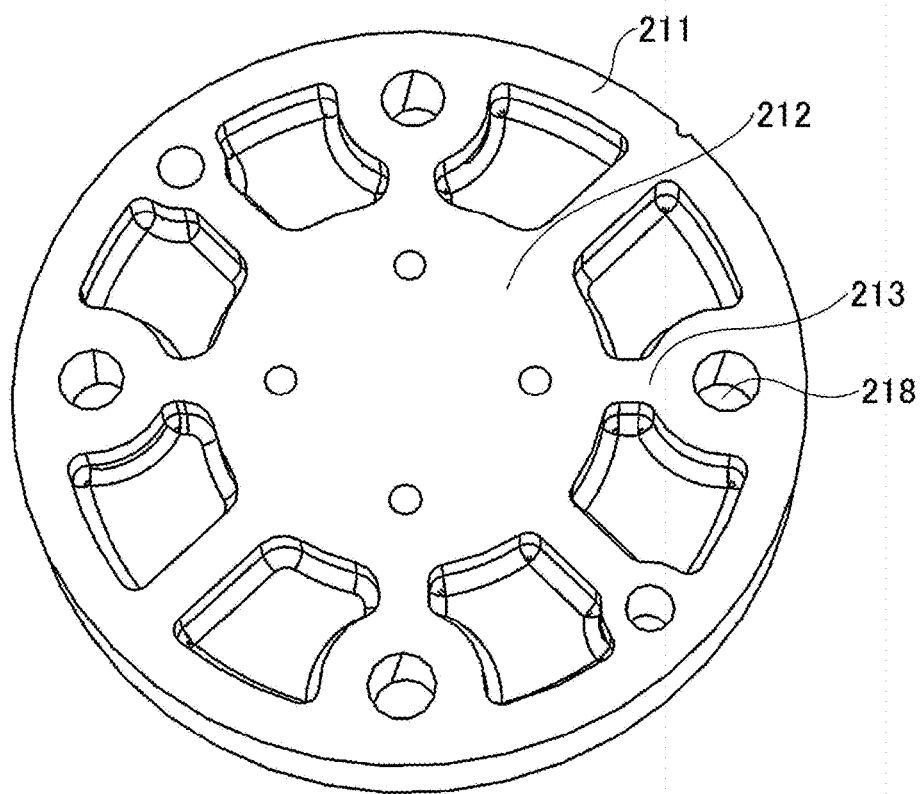
FIG. 16 is a perspective view illustrating a receiving plate constituting the strain inducing body.

FIG. 16 is a perspective view of the force receiving plate included in the strain inducing body. As illustrated in FIG. 16, the force receiving plate 210 is a member that is substantially disk-shaped as a whole and receives the force and moment from a target object. The force receiving plate 210 includes an outer frame 211 that is substantially ring-shaped in a plan view, and includes a central portion 212 that is apart from the outer frame 211 and is disposed inside the outer frame 211, where the central portion 212 is substantially circular in a plan view. The force receiving plate 210 also includes multiple beam structures 213 each of which couples the outer frame 211 and the central portion 212.

Even when the beam structure 213 causes increase in strength of the force receiving plate 210, and the force or moment is received through the target object deformation of the force receiving plate 210 itself is negligible. With this arrangement, without the losses in the deformation (displacement), the force or moment is transmitted to the strain inducing portion 220 that is connected to the central portion 212. screw holes 218 are each provided in a portion of the force receiving plate 210 that extends from the inside of the outer frame 211 toward each beam structure 213. The screw holes 218 can be used for, for example, screwing the force receiving plate 210 into the target object.

Figure 17:
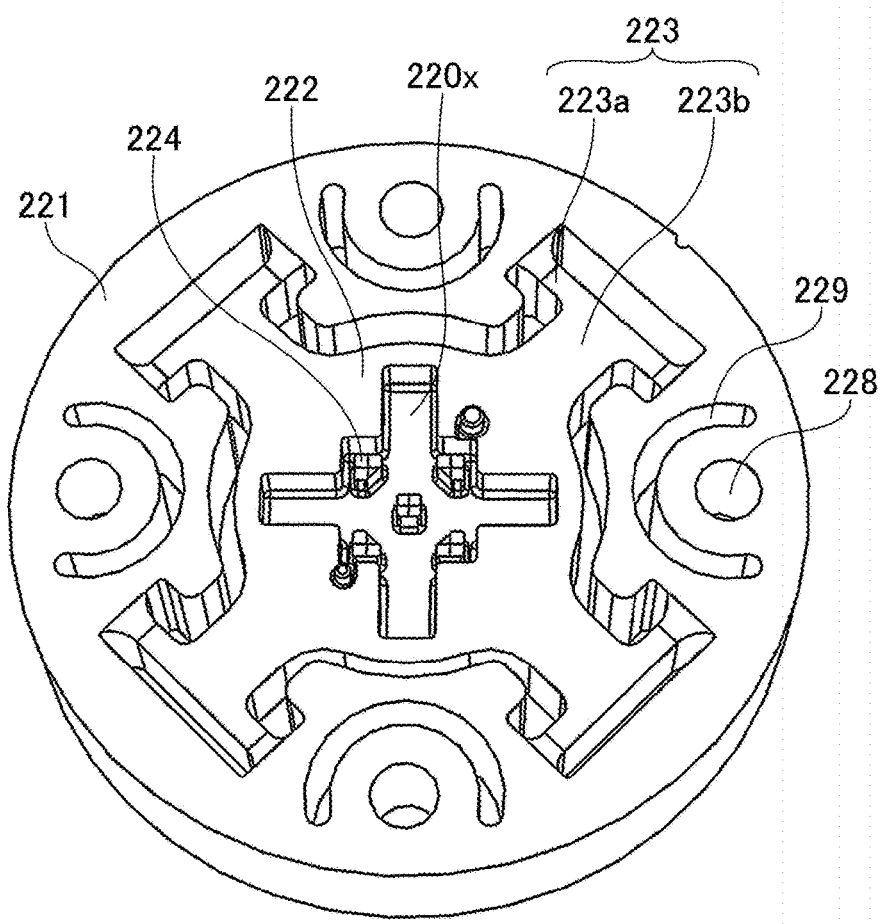
FIG. 17 is a perspective view illustrating a strain inducing portion constituting the strain inducing body.
Figure 18:
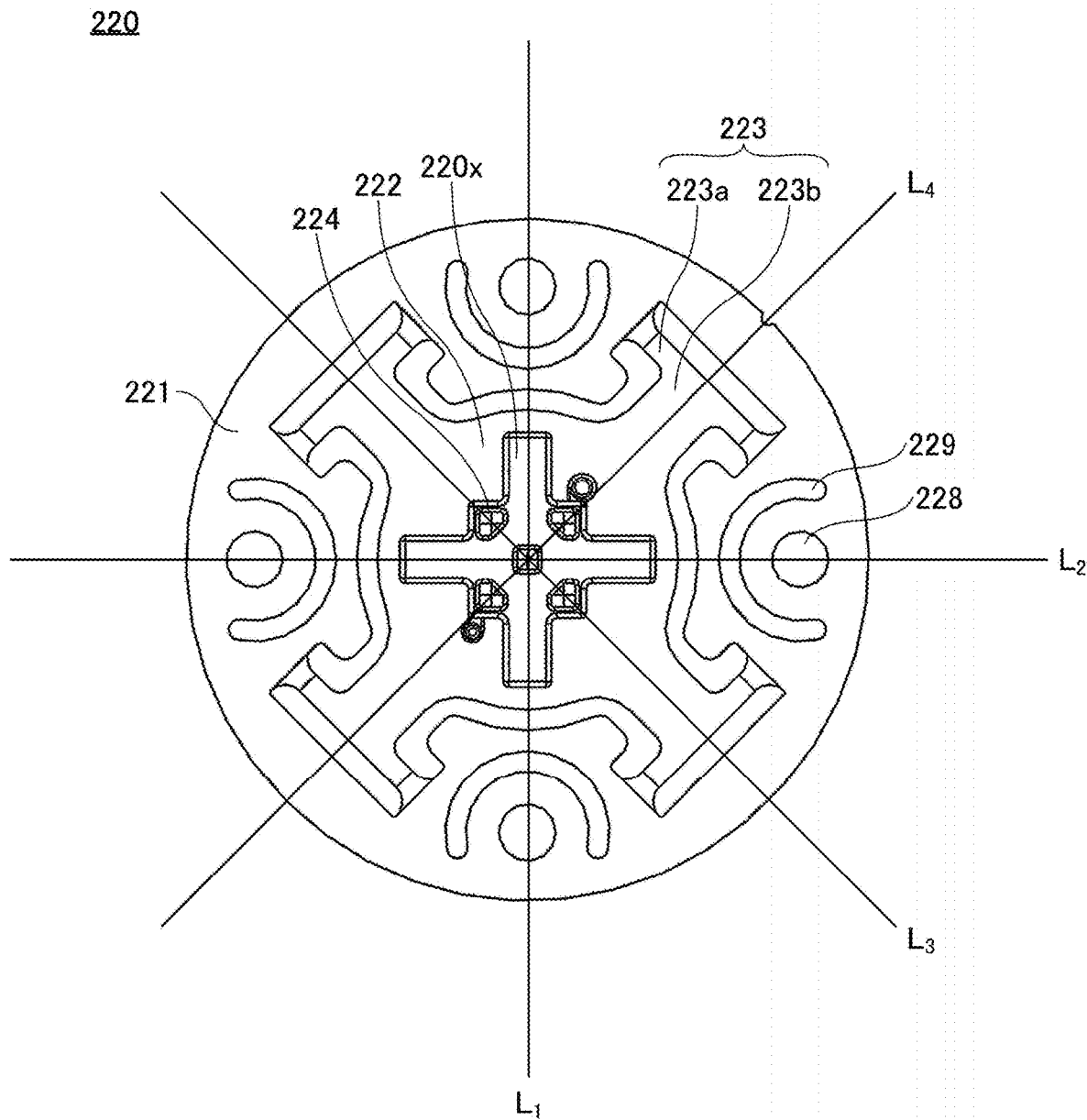
FIG. 18 is a plan view illustrating the strain inducing portion constituting the strain inducing body.

FIG. 17 is a perspective view of the strain inducing portion included in the strain inducing body. FIG. 18 is a plan view illustrating the strain inducing portion constituting the strain inducing body. As illustrated in FIGS. 17 and 18, the strain inducing portion 220 is a substantially disk-shaped member as a whole, and deforms in response to receiving the force from the force receiving plate 210.

The strain inducing portion 220 includes an outer frame 221 that is substantially ring-shaped in a plan view, and includes a central portion 222 that is apart from the outer frame 221 and is disposed inside the outer frame 221, where the central portion 222 is substantially circular in a plan view. The strain inducing portion 220 also includes multiple beam structures 223 each of which couples the outer frame 221 and the central portion 222. The outer diameter of the outer frame 221 is, for example, about 50 mm. The thickness of the beam structure 223 may, for example, be about 3 mm to 8 mm.

A plurality of beam structures 223 are, for example, disposed point symmetrically with respect to the center of the strain inducing portion 220. For example, there are four beam structure 223. Each beam structure 223 is, for example, T-patterned, including a first beam 223$a$, and a second beam 223$b$ extending in a direction orthogonal to the first beam 223$a$ from the center of the first beam 223$a$. Both ends of the first beam 223$a$ couple to the outer frame 221 and the ends of the second beam 223$b$ couple to the central portion 222. For example, in a plan view, the strain inducing portion 220 is four times symmetrical with respect to the center of the outer frame 221.

The central portion 222 is formed to be thinner than the outer frame 221, and each beam structure 223 is further thinner than the central portion 222. The top surface of the central portion 222 and the top surface of each beam structure 223 are approximately the same plane and are located lower than the top surface of the outer frame 221. The bottom surface of the central portion 222 protrudes slightly from the bottom surface of the outer frame 221. The bottom surface of each beam structure 223 is located higher than the bottom surface of the outer frame 221 and the bottom surface of the central portion 222. Only the beam structures 223 and the central portion 222 deform in response to receiving the force from the force receiving plate 210, and the outer frame 221 does not deform. Although the central portion 222 moves in accordance with the deformation of each beam structure 223, the central portion 222 itself does not deform.

A groove 220x is formed at the surface of the central portion 222 toward the input transmitter 230. The shape of the groove 220x is a shape in which, in a plan view, a square groove portion overlaps with a cross-shaped groove portion that includes two elongated groove portions that are each longer than one side of the square groove portion and are perpendicular to each other. The depth of the square groove portion is the same as that of each cross-shaped groove portion.

First connection portions 224, which include five columnar portions each protruding toward the input transmitter 230, are respectively disposed at four corners of the square groove portion other than the cross-shaped groove portion, and the center of the square groove portion. In this case, the first connection portions 224 do not contact an inner wall of the groove 220x. Each first connection portion 224 is a portion connected to a given support among the supports 101 to 105 in the sensor chip 100. The top surface of each first connection portion 224 is approximately the same plane and is located lower than the top surface of the central portion 222 and the top surfaces of the beam structures 223.

screw holes 228 are provided in the outer frame 221. For example, with use of screws, the screw holes 228 can be used to secure the strain inducing portion 220, the input transmitter 230, and the cover plate 240, to a fixed side (a robot-side or the like). In the example of FIGS. 17 and 18, four screw holes 228 are provided which are circular in a plan view. The size of the screw holes 228 is, for example, M5 of the JIS standard.

A space 229 is provided outside of each screw hole 228 of the outer frame 221, spaced from the screw hole 228. The space 229 may be provided, for example, in an arc-shape. The space 229 partially surrounds a corresponding one of the screw holes 228 in a plan view. The space 229 is arranged so that the opening side of the arc faces the outer circumferential side of the outer frame 221 in a plan view. In other words, in the space 229, the apex of the arc is located at the side of the center of the outer frame 221 more than at both ends of the arc.

Each screw hole 228 is disposed between adjacent beam structures 223 in a plan view. The space 229 is provided at least between the screw holes 228 and the beam structures 223 adjacent both sides of screw hole 228 in a plan view. The space 229 preferably penetrates the outer frame 221. The space 229 may not penetrate the outer frame 221. The width of the space 229 is substantially constant, for example from 0.5 mm to 1.5 mm. The width of the space 229 may not be constant, and the width of both ends of the arc of the space 229 may be widened to be 0.5 mm to 1.5 mm, and the width between one end and the other end of the arc may be narrowed to be 0.2 mm, for example.

Thus, in the strain inducing body 200, the space 229 is provided between the screw hole 228 and the beam structures 223 adjacent to both sides of the screw hole 228 in the strain inducing body 220. This makes it difficult to transmit the force generated when fastening the strain inducing body 200 to the target object with a screw to the central portion 222. Also, even when the force is transmitted, the inner side rather than the central portion 222 will maintain the same shape and will easily be displaced the same as a whole. In addition, when the strain inducing body 200 is mounted to the target object, when a temperature distribution is generated in the strain inducing body 200 due to the heat generation of the target object, deformation of the central portion 222 side can be suppressed.

Therefore, the displacement of the first connection portion 224 connected with the supports 101 to 105 of the sensor chip 100 can be suppressed, and the displacement of the five first connection portions 224 can be uniformized. As a result, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

As illustrated in FIG. 18, the four screw holes 228 include two opposing screw holes 228 facing each other across the center of the outer frame 221 and the other two opposing screw holes 228 facing each other across the center of the outer frame 221, in a plan view. In a plan view, a virtual straight line $L_1$ connecting the centers of two opposing screw holes 228 facing each other across the center of the outer frame 221 and a virtual straight line $L_2$ connecting the centers of the other two opposing screw holes 228 form a virtual cross line perpendicular to each other.

The four beam structures 223 also include two opposing beam structures 223 facing each other across the center of the outer frame 221 and the other two opposing beam structures 223 facing each other across the center of the outer frame 221 in a plan view. In a plan view, a virtual straight line $L_3$ connecting the center lines of the width directions of the two opposing beam structures 223 facing each other across the center of the outer frame 221 and a virtual straight line $L_4$ connecting the center lines of the width directions of the other two opposing beam structures 223 facing each other across the center of the outer frame 221 form a virtual cross line perpendicular to each other.

That is, the two opposing beam structures 223 facing each other across the center of the outer frame 221 and the other two opposing beam structures 223 facing each other across the center of the outer frame 221 form a substantially cross-like beam in a plan view.

In a plan view, the cross-line formed by the straight lines $L_1$ and $L_2$ and the cross-line formed by the straight lines $L_3$ and $L_4$ are preferably offset by 45 degrees. That is, each beam structure 223 is preferably located in the middle portion of adjacent screw holes 228. In consideration of manufacturing variations or the like, 45 degrees shall include a range of 45 degrees±5 degrees.

Within the outer frame 221, the middle portion of the adjacent screw holes 228 is positioned the farthest away from each screw hole 228 and is thus least susceptible to deformation. Therefore, by extending the beam structure 223 from the middle portion of the adjacent screw hole 228, it is possible to prevent the force generated when the strain inducing body 200 is fastened to the target object by the screw from being transmitted to the central portion 222. Also, the inner side rather than the central portion 222 will maintain the same shape and will easily be displaced the same as a whole. In addition, when the strain inducing body 200 is mounted to the target object, when a temperature distribution is generated in the strain inducing body 200 due to the heat generation of the target object, deformation of the central portion 222 side can be suppressed.

As a result, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

A space is provided toward the top surface of the central portion 222. For example, a circuit board or the like that includes electronic components such as a connector and a semiconductor element may be disposed on the top surface of the central portion 222 so as not to enter the top surface of the outer frame 221.

Figure 19:
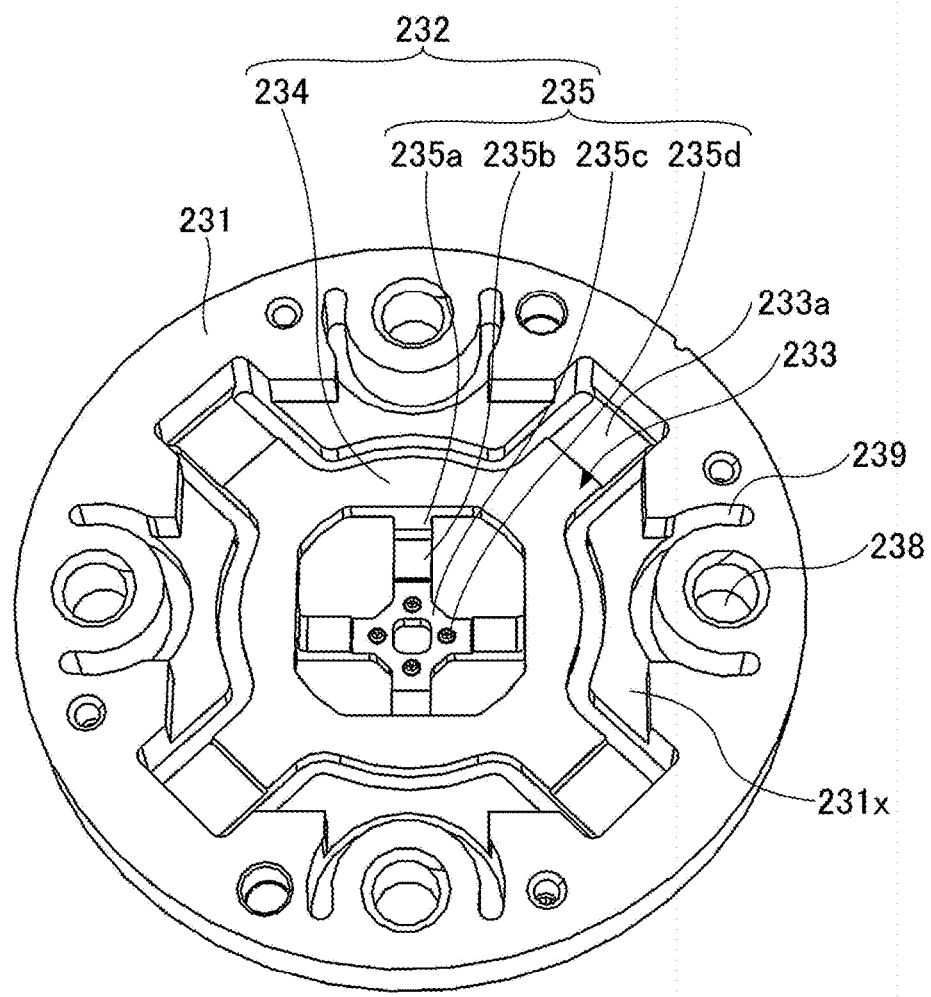
FIG. 19 is a perspective view illustrating a top surface side illustrating the input transmitter constituting the strain inducing body.
Figure 20:
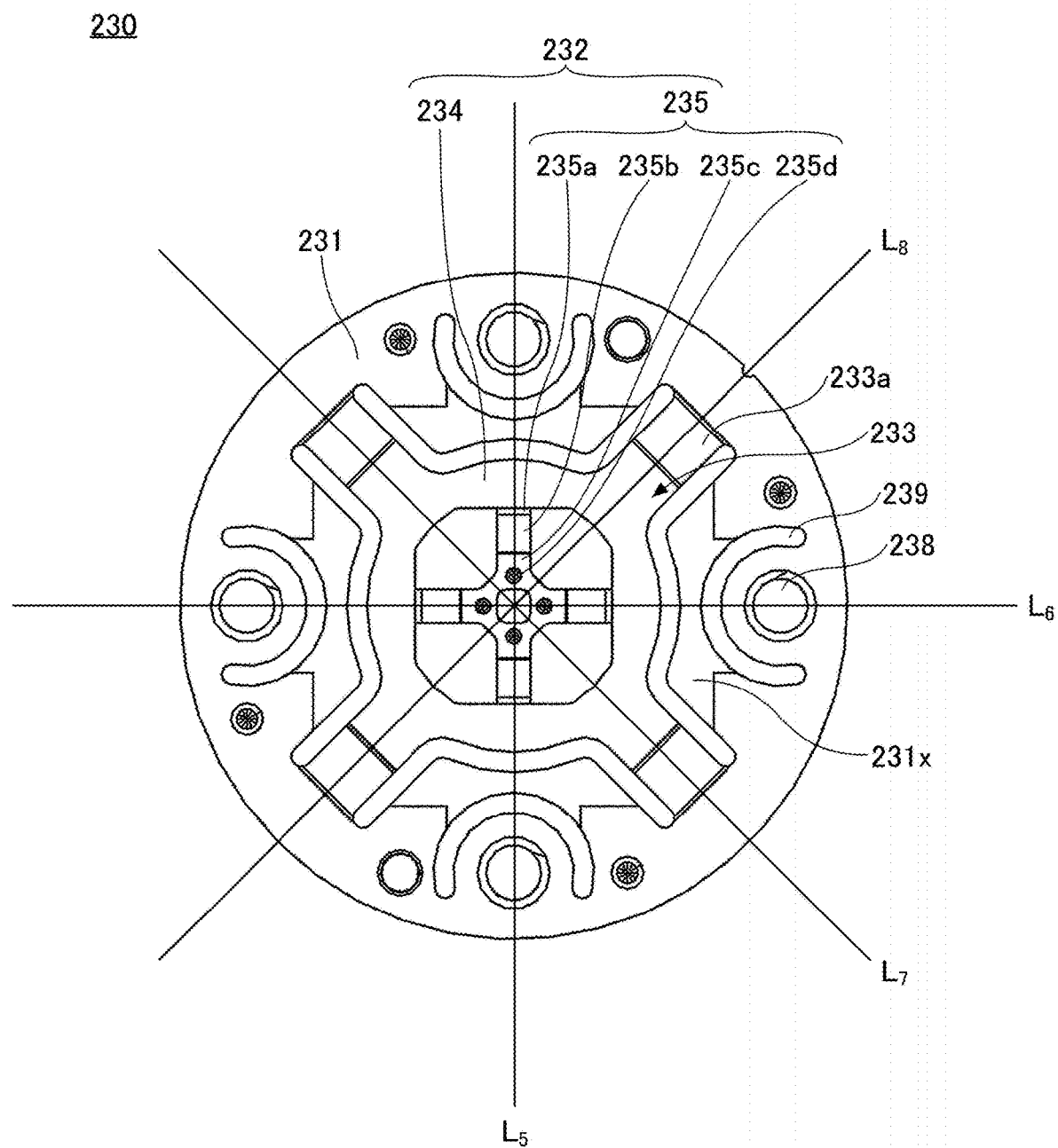
FIG. 20 is a plan view illustrating the input transmitter constituting the strain inducing body.
Figure 21:
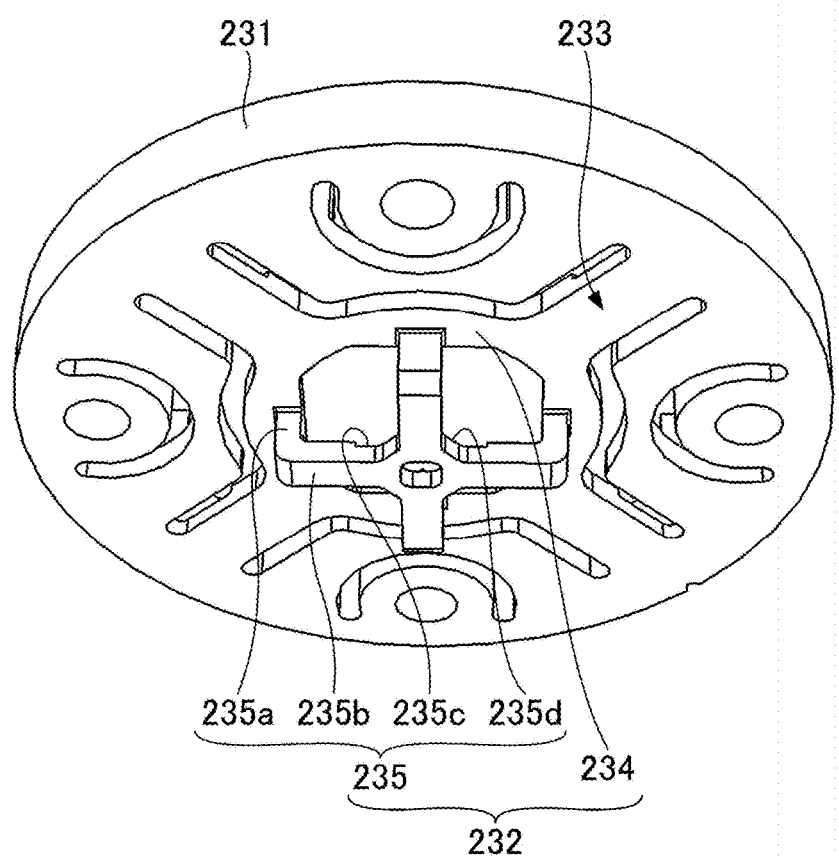
FIG. 21 is a perspective view illustrating a bottom surface side illustrating the input transmitter constituting the strain inducing body.
Figure 22:
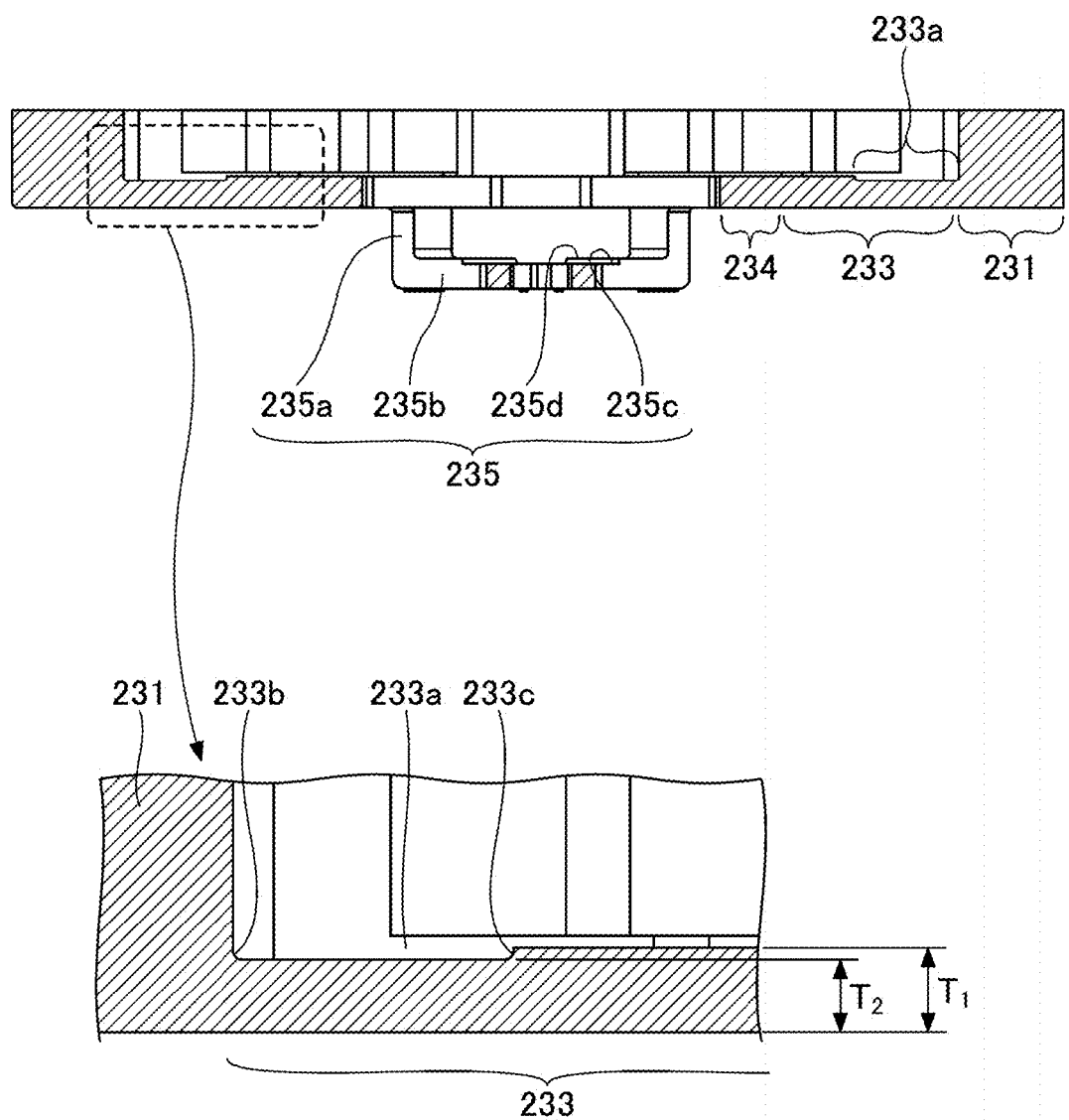
FIG. 22 is a cross-sectional view illustrating the input transmitter constituting the strain inducing body.

FIG. 19 is a perspective top view of the input transmitter included in the strain inducing body. FIG. 20 is a perspective bottom view of the input transmitter included in the strain inducing body. FIG. 21 is a perspective view illustrating a bottom surface side illustrating the input transmitter constituting the strain inducing body. FIG. 22 is a cross-sectional view illustrating input transmitter included in the strain inducing body, and illustrates a cross-section along the $L_7$ line of FIG. 20. As illustrated in FIGS. 19 to 22, the input transmitter 230 is a member that is substantially disk-shaped as a whole and transmits deformation (input) of the strain inducing portion 220 to the sensor chip 100.

The input transmitter 230 includes an outer frame 231 that is substantially ring-shaped in a plan view, and includes a central portion 232 that is apart from the outer frame 231 and is disposed inside the outer frame 231. The input transmitter 230 also includes multiple beam structures 233 each of which couples the outer frame 231 and the central portion 232. The outer diameter of the outer frame 231 is, for example, about 50 mm. For example, given beam structures are disposed so as to be point-symmetric with respect to the center of the input transmitter 230. The number of beam structures 233 is, for example, four. Each beam structure 233 is, for example, I-shaped. The beam structure 233 of the input transmitter 230 and the beam structure 223 of the strain inducing portion 220 overlap at least a part in a plan view.

The outer frame 231 is formed to be thicker than other portions and is highly rigid, so that the outer frame 231 is least deformable. The central portion 232 also includes a substantially ring-shaped first coupling portion 234 in a plan view and an accommodating portion 235 that is a substantially cross-shaped in a plan view that extends from the bottom surface of the coupling portion 234 toward the strain inducing portion 220. The accommodating portion 235 is provided inside the first coupling portion 234 and is capable of accommodating the sensor chip 100. Each beam structure 233 is connected at one end to the outer frame 231 and extends inwardly from the outer frame 231 and is connected at the other end to each other by the first coupling portion 234.

Thus, by connecting the beam structure 233 extending from four directions of the input transmitter 230 with the first coupling portion 234, the stiffness of the accommodating portion 235 can be increased. As a result, the force generated when the strain inducing body 200 is fastened to the target object with screws is hardly transmitted to the first coupling portion 234. Also, the inner side rather than the first coupling portion 234 will maintain the same shape and will easily be displaced the same as a whole. In addition, when the strain inducing body 200 is mounted to the target object, when a temperature distribution is generated in the strain inducing body 200 due to the heat generation of the target object, deformation of the first coupling portion 234 side can be suppressed.

Therefore, the displacement of the four second connection portions 235d connected to the force points 151 to 154 of the sensor chip 100 can be suppressed, and the displacement of the four second connection portions 235d can be uniformized. As a result, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

The beam structure 233 and the first coupling portion 234 are formed thinner than the outer frame 231. The top surface of the beam structure 233 and the first coupling portion 234 is located lower than the top surface of the outer frame 231. The bottom surface of the outer frame 231, the bottom surface of the beam structure 233, and the bottom surface of the first coupling portion 234 are substantially one surface. The input transmitter 230 does not deform due to the force or moment received by any part.

Each beam structure 233 preferably has a counterbore part 233a which makes the thickness of first end (one end) connected to the outer frame 231 thinner than the thickness of second end (the other end) connected to the first coupling portion 234. The counterbore part 233a is preferably provided in the entire width direction of the beam structure 233 on the side closer to the outer frame 231 than on the side of the first coupling portion 234. The thickness $T_1$ of the side of the central portion 232 of the beam structure 233 is, for example, about 1.5 mm. The thickness $T_1$ of the side of the central portion 232 of the beam structure 233 may be the same as the thickness of the first coupling portion 234.

The thickness $T_2$ of the counterbore part 233a (the thickness at one end of the beam structure 233) is, for example, thicker than 1 mm and less than 1.25 mm. That is, the depth of the counterbore part 233a based on the top surface of the beam structure 233 is, for example, about 0.25 mm to 0.5 mm. The length in the longitudinal direction of the beam structure 233 is, for example, about 8 mm, and the width is about 4 mm. The length of the counterbore part 233a is, for example, about 5 mm.

The beam structure 233 has the counterbore part 233a. Thus, the counterbore part 233a of the beam structure 233 absorbs the deformation of the outer frame 231 side when the strain inducing body 200 is fastened to the target object with screws even when the outer frame 231 side is deformed. As a result, the force generated when the strain inducing body 200 is fastened to the target object with screws is hardly transmitted to the first coupling portion 234. Also, the inner side rather than the first coupling portion 234 will maintain the same shape and will easily be displaced the same as a whole. In addition, when the strain inducing body 200 is mounted to the target object, when a temperature distribution is generated in the strain inducing body 200 due to the heat generation of the target object, deformation of the first coupling portion 234 side can be suppressed.

As a result, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

A corner portion 233b of the outer frame 231 of the counterbore part 233a is preferably an R-shape in a cross-sectional view. In addition, the corner portion 233c on the side of the first coupling portion 234 of the counterbore part 233a is preferably an R-shape in a cross-sectional view.

Accordingly, the displacement of the four second connection portions 235d connected to the force points 151 to 154 of the sensor chip 100 can be further suppressed, and the displacement of the four second connection portions 235d can be further uniformized. As a result, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

A accommodating portion 235 is provided inside the first coupling portion 234. The accommodating portion 235 has four vertical supports 235a connected at one end to the first coupling portion 234 and extending vertically from the bottom surface of the first coupling portion 234 toward the strain inducing portion 220, four horizontal supports 235b extending horizontally from the lower end of the vertical supports 235a, and a second coupling portion 235c connecting the other end of the horizontal support 235b to each other.

That is, the distal end side of the four horizontal supports 235b is connected by the second coupling portion 235c. In the second coupling portion 235c, the bottom surface is substantially one surface with the bottom surface of the horizontal support 235b, and the top surface is thinned one step below the horizontal support 235b. A through hole may be provided at the center of the second coupling portion 235c.

Four second connection portion 235d protruding on the side of the cover plate 240 are disposed on the bottom surface of the second coupling portion 235c so as not to contact the inner wall of the second coupling portion 235c. Each second connection portion 235d is approximately positioned on a line that longitudinally bisects each horizontal support 235b. The second connection portion 235d is a portion connected to the force points 151 to 154 of the sensor chip 100.

The distal end of the four horizontal supports 235b may be isolated. In this case, by connecting the other end of each beam structure 233 with each other by the first coupling portion 234, the force generated when the strain inducing body 200 is fastened to the target object with screws is hardly transmitted to the first coupling portion 234 side. Also, the inner side rather than the first coupling portion 234 will maintain the same shape and will easily be displaced the same as a whole. In addition, when the strain inducing body 200 is mounted to the target object, when a temperature distribution is generated in the strain inducing body 200 due to the heat generation of the target object, deformation of the first coupling portion 234 side can be suppressed.

As a result, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

However, the horizontal supports 235b extending from four directions are preferably connected with the second coupling portion 235c. Accordingly, the displacement of the four second connection portions 235d connected to the force points 151 to 154 of the sensor chip 100 can be further suppressed, and the displacement of the four second connection portions 235d can be further uniformized. As a result, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

Screw holes 238 are provided in the outer frame 231. The screw holes 228 are, for example, fastening holes which can be used to fasten the strain inducing portion 220, the input transmitter 230, and the cover plate 240 to the fixed side (on the side of a robot or the like) by screws. In the example of FIGS. 19 and 22, four screw holes 238 are provided which are circular in a plan view. The size of the screw hole 238 is, for example, M5 of the JIS standard.

A space 239 is provided outside of each screw hole 238 of the outer frame 231, spaced from the screw hole 238. In the space 239, a portion of the top surface side of the outer frame 231 communicates with a thin plate portion 231x formed to be thinner than the outer peripheral side in the outer frame 231. The top surface of the thin plate portion 231x and the top surface of the first coupling portion 234 are substantially one plane. By providing the thin plate portion 231x, a wide space can be formed, so that components such as a substrate and the like can be disposed.

The space 239 may be provided, for example, in an arc-shape. The space 239 partially surrounds a corresponding one of the screw holes 238 in a plan view. The space 239 is arranged so that the opening side of the arc faces the outer circumferential side of the outer frame 231 in a plan view. In other words, in the space 239, the apex of the arc is located at the side of the center of the outer frame 231 more than at both ends of the arc.

Each screw hole 238 is disposed between adjacent beam structures 233 in a plan view. The space 239 is provided at least between the screw holes 238 and the beam structures 233 adjacent both sides of screw hole 238 in a plan view. The space 239 preferably penetrates the outer frame 231. The space 239 may not penetrate the outer frame 231. The width of the space 239 is substantially constant, for example from 0.5 mm to 1.5 mm. The width of the space 239 may not be constant, and the width of both ends of the arc of the space 239 may be widened to be 0.5 mm to 1.5 mm, and the width between one end and the other end of the arc may be narrowed to be 0.2 mm, for example.

Each screw hole 238 and each screw hole 228 are provided so as to overlap in a plan view, and each space 239 and each space 229 are provided so as to overlap in a plan view.

Thus, in the strain inducing body 200, the space 239 is provided between the screw hole 238 and the beam structures 233 adjacent to both sides of the screw hole 238 in the input transmitter 230. This makes it difficult to transmit the force generated when fastening the strain inducing body 200 to the target object with a screw to the first coupling portion 234. Also, even when the force is transmitted, the inner side rather than the first coupling portion 234 will maintain the same shape and will easily be displaced the same as a whole. In addition, when the strain inducing body 200 is mounted to the target object, when a temperature distribution is generated in the strain inducing body 200 due to the heat generation of the target object, deformation of the central portion 222 side can be suppressed.

As a result, as described above, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

As illustrated in FIG. 20, the four screw holes 238 include two opposing screw holes 238 facing each other across the center of the outer frame 231 and the other two opposing screw holes 238 facing each other across the center of the outer frame 231 in a plan view.

In a plan view, a virtual straight line $L_5$ connecting the centers of the two opposing screw holes 238 facing each other across the center of the outer frame 231 and a virtual straight line $L_6$ connecting the centers of the other two opposing screw holes 238 facing each other across the center of the outer frame 231 form a virtual cross line perpendicular to each other.

Four beam structures 233 also include two opposing beam structures 233 facing each other across the center of the outer frame 231 and the other two opposing beam structures 233 facing each other across the center of the outer frame 231 in a plan view.

In a plan view, a virtual straight line $L_7$ connecting the centers of the width direction of the two opposing beam structures 233 facing each other across the center of the outer frame 231 and a virtual straight line $L_8$ connecting the centers of the width direction of the other two opposing beam structures 233 facing each other across the center of the outer frame 231 form a virtual cross line perpendicular to each other.

That is, the two opposing beam structures 233 facing each other across the center of the outer frame 231 and the other two opposing beam structures 233 facing each other across the center of the outer frame 231 form a cross line beam in a plan view.

In a plan view, the cross line formed by the straight lines $L_5$ and $L_6$ and the cross line formed by the straight lines $L_7$ and $L_8$ are preferably offset by 45 degrees. That is, each beam structure 223 is preferably located in the middle portion of adjacent screw holes 238. In consideration of manufacturing variations or the like, 45 degrees shall include a range of 45 degrees±5 degrees.

As described above, the outer frame 231 is more rigid than the other portions, but the middle portion of the outer frame 231 as well as the adjacent screw holes 238 are positioned the farthest away from the respective screw holes 238 and thus are least deformable. Therefore, by extending the beam structure 233 from the middle portion of the adjacent screw hole 238, the force generated when the strain inducing body 200 is fastened to the target object with screws is hardly transmitted to the first coupling portion 234 side. Also, the inner side rather than the first coupling portion 234 will maintain the same shape and will easily be displaced the same as a whole. In addition, when the strain inducing body 200 is mounted to the target object, when a temperature distribution is generated in the strain inducing body 200 due to the heat generation of the target object, deformation of the first coupling portion 234 side can be suppressed.

As a result, as described above, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

In a plan view, the cross line formed by the straight lines $L_5$ and $L_6$ overlaps the cross line formed by the straight lines $L_1$ and $L_2$ (see FIG. 18). In a plan view, the cross line formed by the straight lines $L_7$ and $L_8$ overlaps the cross line formed by the straight lines $L_3$ and $L_4$ (see FIG. 18).

In the accommodating portion 235, the two vertical supports 235a and the two horizontal supports 235b face each other across the center of the outer frame 231 in a plan view, and the other two vertical supports 235a and the other two horizontal supports 235b face each other across the center of the outer frame 231 in a plan view.

In a plan view, a virtual line connecting the centerlines of the two opposing vertical supports 235a and two opposing horizontal supports 235b facing each other across the center of the outer frame 231 overlap with the line $L_5$. In addition, in a plan view, a virtual line connecting the centerlines of the other two opposing vertical supports 235a and the horizontal supports 235b facing each other across the center of the outer frame 231 overlap with the line $L_6$ perpendicular to the line $L_5$.

That is, the two opposing vertical supports 235a and the horizontal supports 235b facing each other across the center of the outer frame 231 and the other two opposing vertical supports 235a and the horizontal supports 235b facing each other across the center of the outer frame 231 form a cross line beam in a plan view.

As described above, it is preferable that the cross line formed by the straight lines $L_5$ and $L_6$ and the cross line formed by the straight lines $L_7$ and $L_8$ are displaced by 45 degrees in a plan view. That is, the longitudinal direction of each horizontal support 235b and the longitudinal direction of each beam structure 233 are preferably displaced by 45 degrees in a plan view.

The middle portion of the inner periphery of adjacent beam structures 233 is the farthest away from the inner periphery of each beam structure 233 and is thus least deformable. Therefore, by extending the vertical support 235a and the horizontal support 235b from the middle portion of the inner peripheral end of the adjacent beam structure 233, the force generated when the strain inducing body 200 is fastened to the target object with screws is hardly transmitted to the second coupling portion 235c side. Also, the inner side rather than the second coupling portion 235c will maintain the same shape and will easily be displaced the same as a whole. In addition, when the strain inducing body 200 is mounted to the target object, when a temperature distribution is generated in the strain inducing body 200 due to the heat generation of the target object, deformation of the second coupling portion 235c can be suppressed.

As a result, as described above, the adverse effects, to load capacity, force characteristics, offset temperature characteristics, and offset variation of the sensor chip 100 caused by the force when fastening the strain inducing body 200 to the target object with screws and the temperature distribution to the strain inducing body 200, can be reduced.

A space is provided toward the top surface of each beam structure 233. For example, a circuit board or the like that includes electronic components such as a connector and a semiconductor element may be disposed on the top surface of each beam structure 233 so as not to enter the top surface of the outer frame 231.

Figure 23:
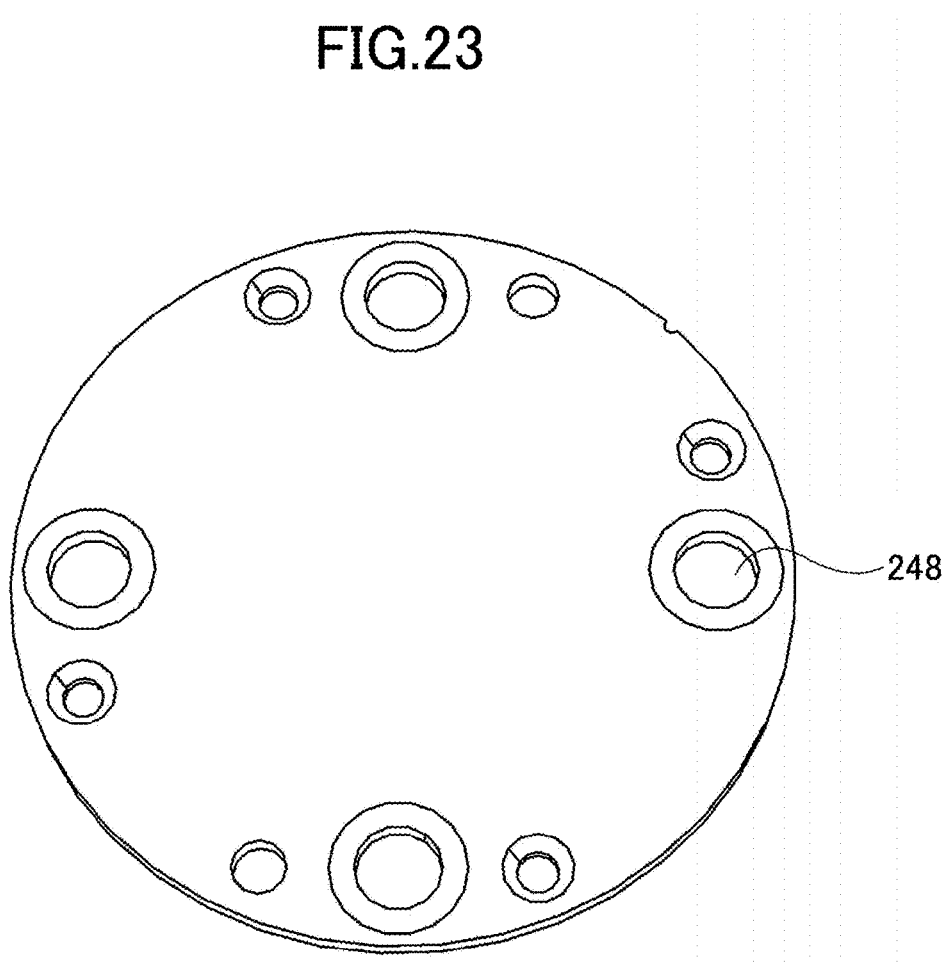
FIG. 23 is a perspective view illustrating a cover plate constituting the strain inducing body.

FIG. 23 is a perspective view of the cover plate included in the strain inducing body. As illustrated in FIG. 23, the cover plate 240 is a disk-like member as a whole and protects internal components (the sensor chip 100 and the like). The cover plate 240 is formed to be thinner than the force receiving plate 210, the strain inducing portion 220, and the input transmitter 230. Screw holes 248 are provided in the cover plate 240. For example, the screw holes 248 can be used to screw the strain-inducing portion 220, the input transmitter 230, and the cover plate 240, to the fixed side (robot-side or the like).

For example, a hard metallic material, such as SUS (stainless steel), can be used as the material of each of the force receiving plate 210, the strain inducing portion 220, the input transmitter 230, and the cover plate 240. In this regard, it is preferable to use stainless steel of SUS 630 specified by the Japanese industrial standards (JIS). Such stainless steel is hard and has increased mechanical strength. For components included in the strain inducing body 200, it is desirable for the force receiving plate 210, the strain inducing portion 220, and the input transmitter 230 to be firmly connected to one another, or to be integrally configured. As a method of connecting the force receiving plate 210, the strain inducing portion 220, and the input transmitter 230, fastening may be performed with screws. Alternatively, welding or the like may be performed. In any case, those components of the strain inducing body 200 need to sufficiently withstand the force and moment that is input to the strain inducing body 200.

In the present embodiment, for example, the force receiving plate 210, the strain inducing portion 220, and the input transmitter 230 are each fabricated by injection molding that uses metal powder, and then sintering of these fabricated components that are stacked is again performed so that they are diffusion-welded. The force receiving plate 210, the strain inducing portion 220, and the input transmitter 230 that are diffusion-welded have necessary and sufficient welding strength. The cover plate 240 may be fastened to the input transmitter 230 by, for example, one or more screws, after mounting of the sensor chip 100 and other internal components.

When the force or moment is applied to the force receiving plate 210 in the strain inducing body 200, the force or moment is transmitted to the central portion 222 of the strain inducing portion 220 connected to the force receiving plate 210, and thus each of four beam structures 223 deforms in response to receiving a given input. In this case, the outer frame 221 and the input transmitter 230 in the strain inducing portion 220 do not deform.

In such a manner, in the strain inducing body 200, each of the force receiving plate 210, the central portion 222 of the strain inducing portion 220, and the beam structures 223 is a movable portion that deforms in response to receiving a predetermined axial force or moment about a predetermined axis. The outer frame 221 of the strain inducing portion 220 is a non-movable portion that does not deform in response to receiving the force or moment. The input transmitter 230, which is joined to the outer frame 221, as a non-movable portion, of the strain inducing portion 220, is a non-movable portion that does not deform in response to receiving the force or moment. Likewise, the cover plate 240, which is joined to the input transmitter 230, is a non-movable portion that does not deform in response to the force or moment.

When the strain inducing body 200 is used in the force sensor device 1, the supports 101 to 105 of the sensor chip 100 are respectively connected to the first connection portions 224 provided on the central portion 222 that is a movable portion. Also, the force point portions 151 to 154 of the sensor chip 100 are respectively connected to the second connection portions 235c that are provided in the accommodating portion 235, which is a non-movable portion. With this arrangement, the sensor chip 100 operates such that detection beams deform through the respective supports 101 to 105, without the movement of the force point portions 151 to 154.

In another example, the strain inducing body 200 may be configured, such that the force point portions 151 to 154 of the sensor chip 100 are respectively connected to the first connection portions 224 that are provided at the central portion 222, which is a movable portion and such that the supports 101 to 105 of the sensor chip 100 is respectively connected to the second connection portions 235c that are provided in the accommodating portion 235, which is a non-movable portion.

In such a case, the sensor chip 100 that can be accommodated in the accommodating portion 235 includes the supports 101 to 105 and the force point portions 151 to 154, where the positional relationship between supports, as well as the positional relationship between force point portions, change in response to receiving a force or moment. In the strain inducing body 200, the central portion 222 that is a movable portion includes first connection portions 224 each of which extends toward the input transmitter 230 and is connected to both a given support among the supports 101 to 105 and one end of a given force point portion among the force points 151 to 154. The accommodating portion 235 includes second connection portions 235c each of which is connected to both the given support among the support 101 to 105 and another end of the given force portion among the force point portions 151 to 154.

[Simulation]

Figure 24:
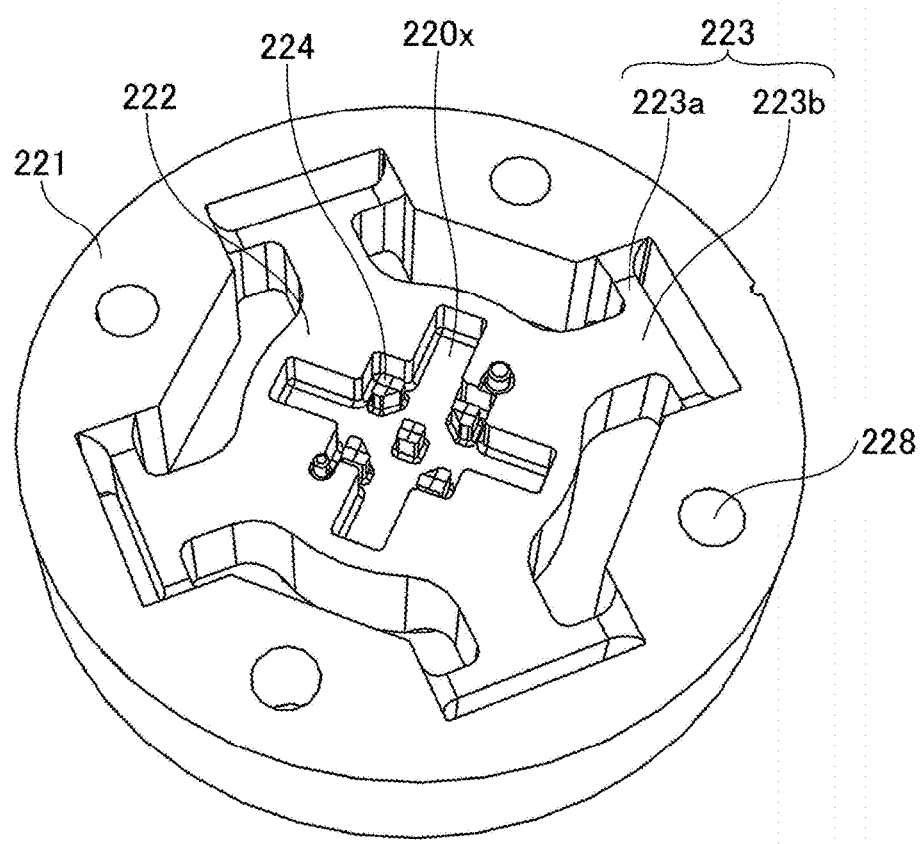
FIG. 24 is a perspective view illustrating the strain inducing portion of the comparative example.

FIG. 24 is a perspective view illustrating the strain inducing portion of the comparative example. As illustrated in FIG. 24, the strain inducing portion 220X of the comparative example does not have a portion corresponding to the space 229, which is different from the strain inducing portion 220 (see FIG. 17).

Figure 25:
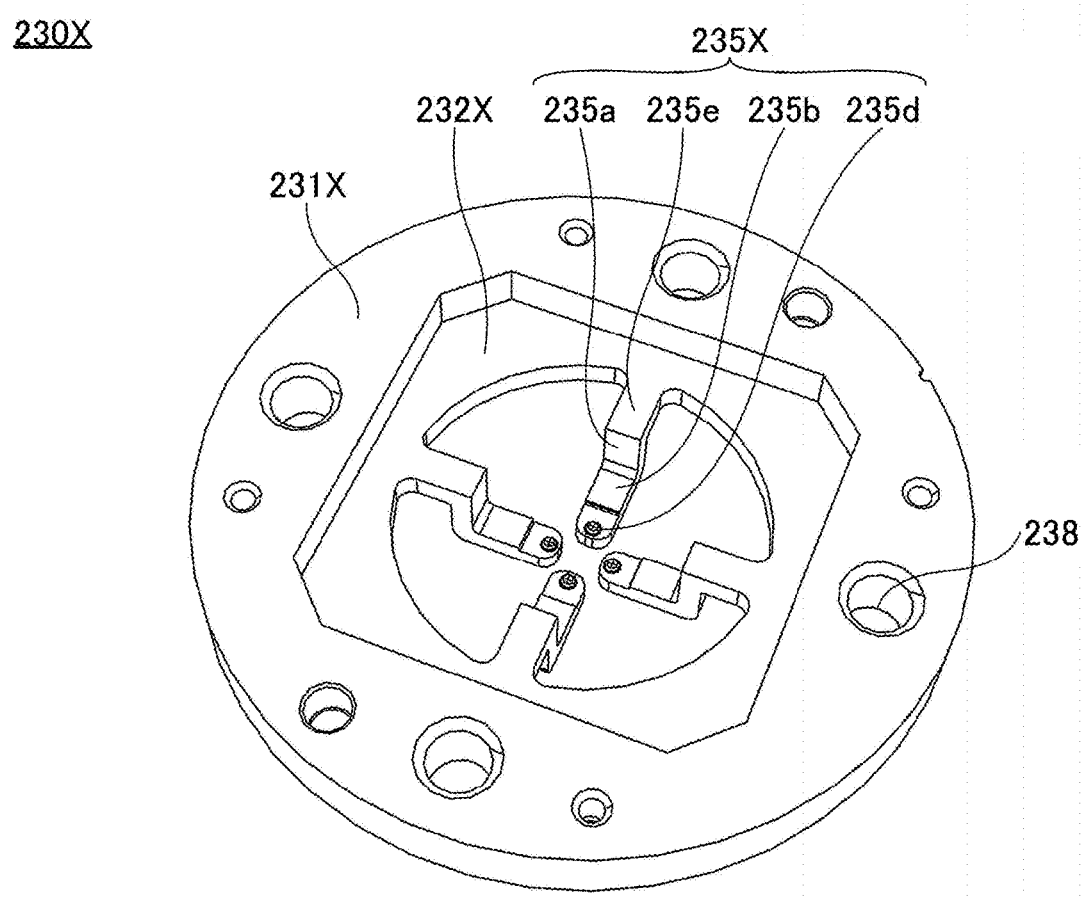
FIG. 25 is a perspective view illustrating the input transmitter of the comparative example.

FIG. 25 is a perspective view illustrating the input transmitter of the comparative example. As illustrated in FIG. 25, the input transmitter 230X of the comparative example includes an outer frame 231X that is substantially a ring-shaped in a plan view, an inner frame portion 232X that is substantially a rectangular-shaped adjacent to the inner circumference of the outer frame 231X in a plan view, and an accommodating portion 235X that is provided inside the inner frame portion 232X. The inner frame portion 232X is formed to be thinner than the outer frame 231X, and the top surface is positioned lower than the top surface of the outer frame 231X. The input transmitter 230X does not have portions corresponding to the beam structure 233, the first coupling portion 234, and the space 239.

Similar to the accommodating portion 235, the accommodating portion 235X includes a vertical support 235a, a horizontal support 235b, and a second connection portion 235d. However, the accommodating portion 235X further includes a second horizontal support 235e extending horizontally from the inner surface of the inner frame portion 232X and connected with the vertical support 235a. Also, unlike the accommodating portion 235, the horizontal support 235b is a substantially cross-shaped in a plan view, but the inner peripheral ends of the horizontal support 235b are spaced apart from each other without being intersected with each other. That is, the accommodating portion 235X does not have a portion corresponding to the second coupling portion 235c.

Figure 26:
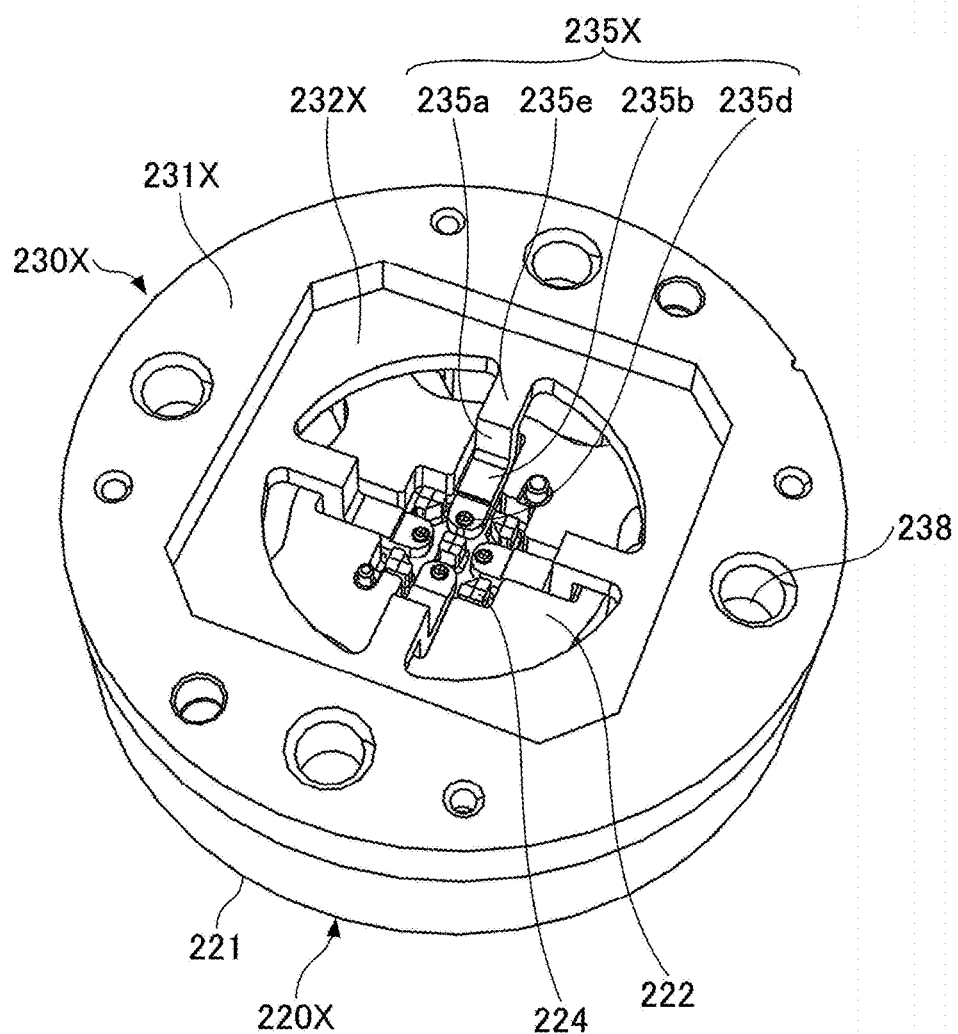
FIG. 26 is a perspective view illustrating a state in which the input transmitter is disposed on the strain inducing portion of the comparative example.

FIG. 26 is a perspective view illustrating a state in which an input transmitter is disposed on a strain inducing portion of the comparative example. The accommodating portion 235X of the input transmitter 230X enters the side of the strain inducing portion 220X. The first connection portion 224 of the strain inducing portion 220X is exposed in the vicinity of the second connection portion 235d in the accommodating portion 235X.

Figure 27:
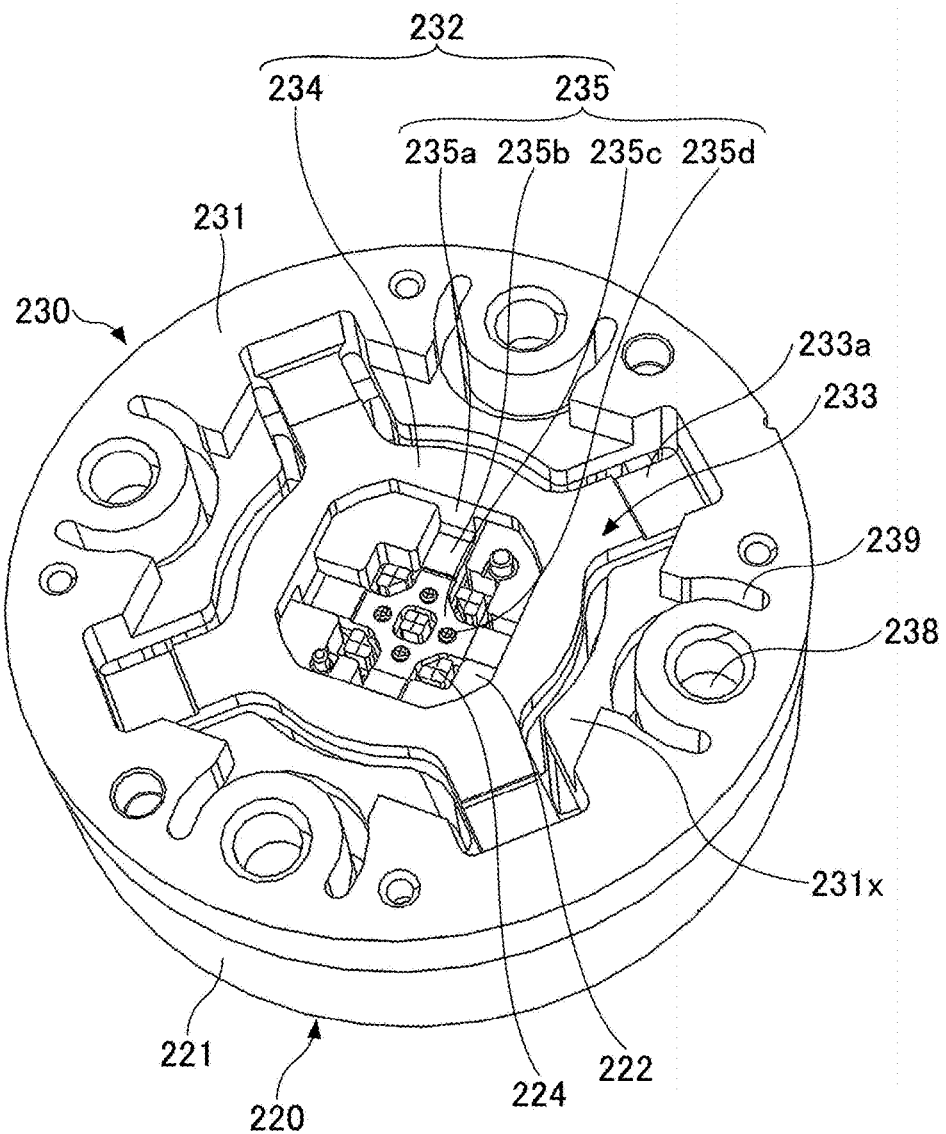
FIG. 27 is a perspective view illustrating a state in which the input transmitter is disposed on the strain inducing portion of the present embodiment.

FIG. 27 is a perspective view illustrating a state in which the input transmitter is disposed on the strain inducing portion of the present embodiment. The accommodating portion 235 of the input transmitter 230 enters the side of the strain inducing portion 220. The first connection portion 224 of the strain inducing portion 220 is exposed in the vicinity of the second connection portion 235d in the accommodating portion 235.

Figure 28:
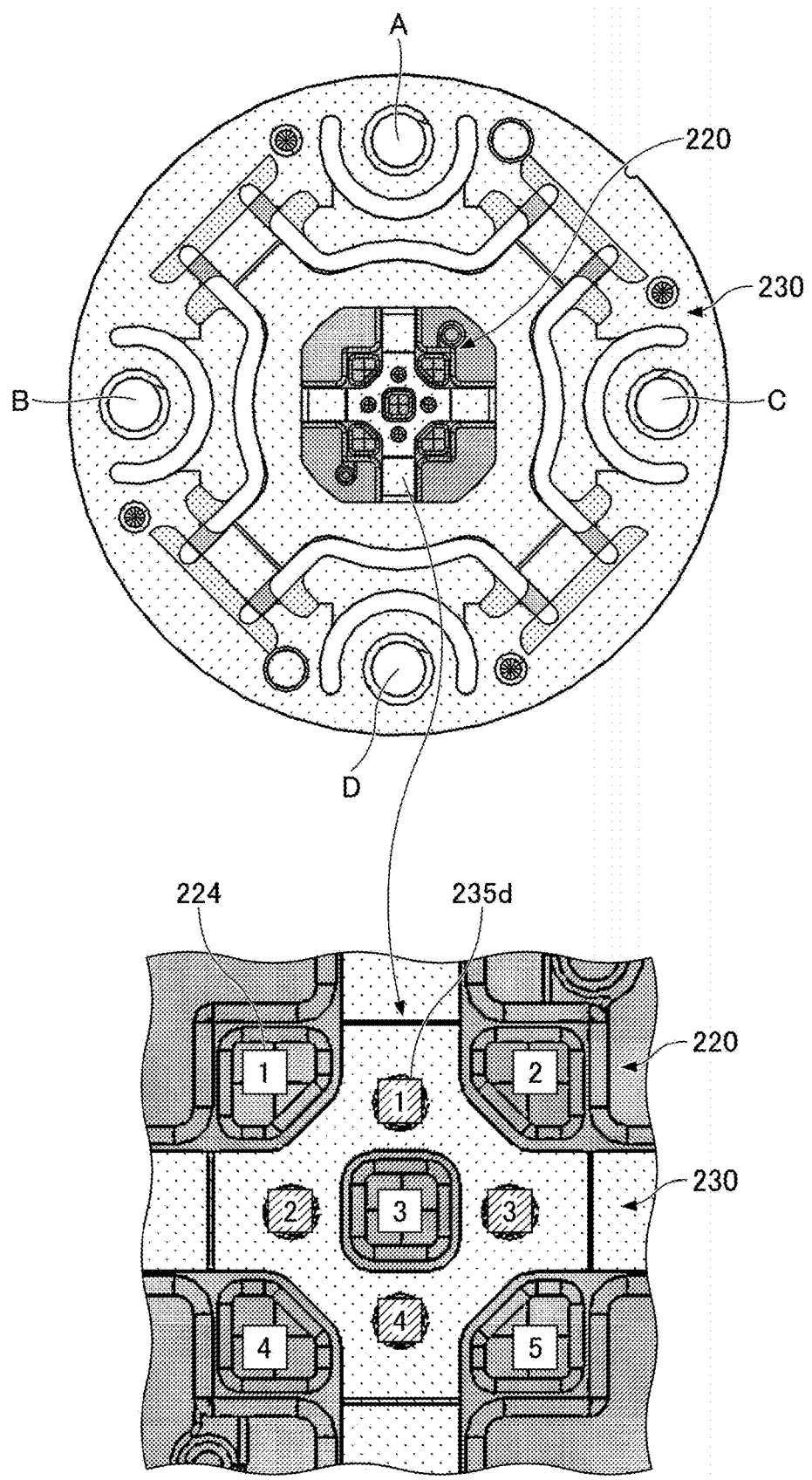
FIG. 28 is a diagram illustrating a measurement point in a simulation.

The results of the simulation performed on the structure of FIG. 26 and the structure of FIG. 27 will now be described. In the simulation, the displacement in the Z-direction of the strain inducing portion and the input transmitter when the axial force of each screw varies when the strain inducing body is fastened to the target object with screws was checked. Specifically, as illustrated in FIG. 28, which is a plan view of the structure of FIG. 27, the displacement in the Z-direction of the measurement points 1 to 5 (upper end of each first connection portion 224) of the strain inducing portion 220 and the measurement points 1 to 4 (upper end of each second connection portion 235d) of the input transmitter 230 were confirmed when the axial forces of the screw holes A, B, C, and D were 5400 N, 4160 N, 7720 N, and 5400 N, respectively. The structure in FIG. 26 was also checked for the displacement in the Z-direction of similar measurement points under the same conditions.

Figure 29:
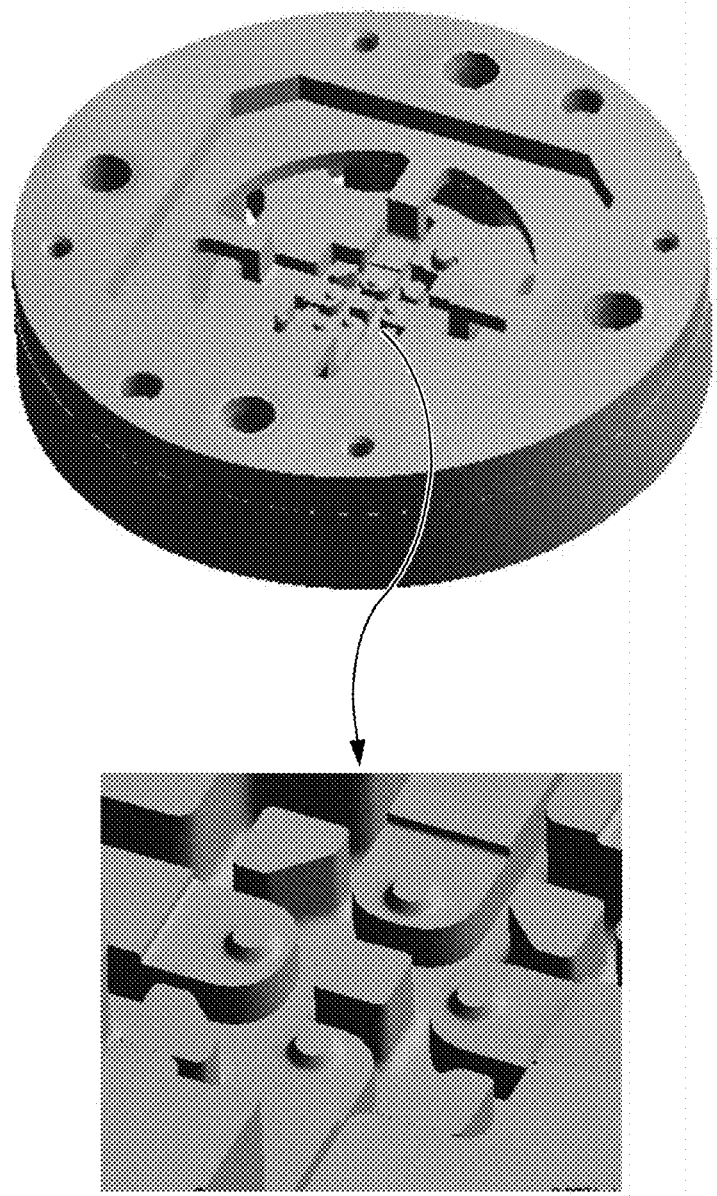
FIG. 29 is a displacement contour diagram of the structure of FIG. 26 of the comparative example.
Figure 30:
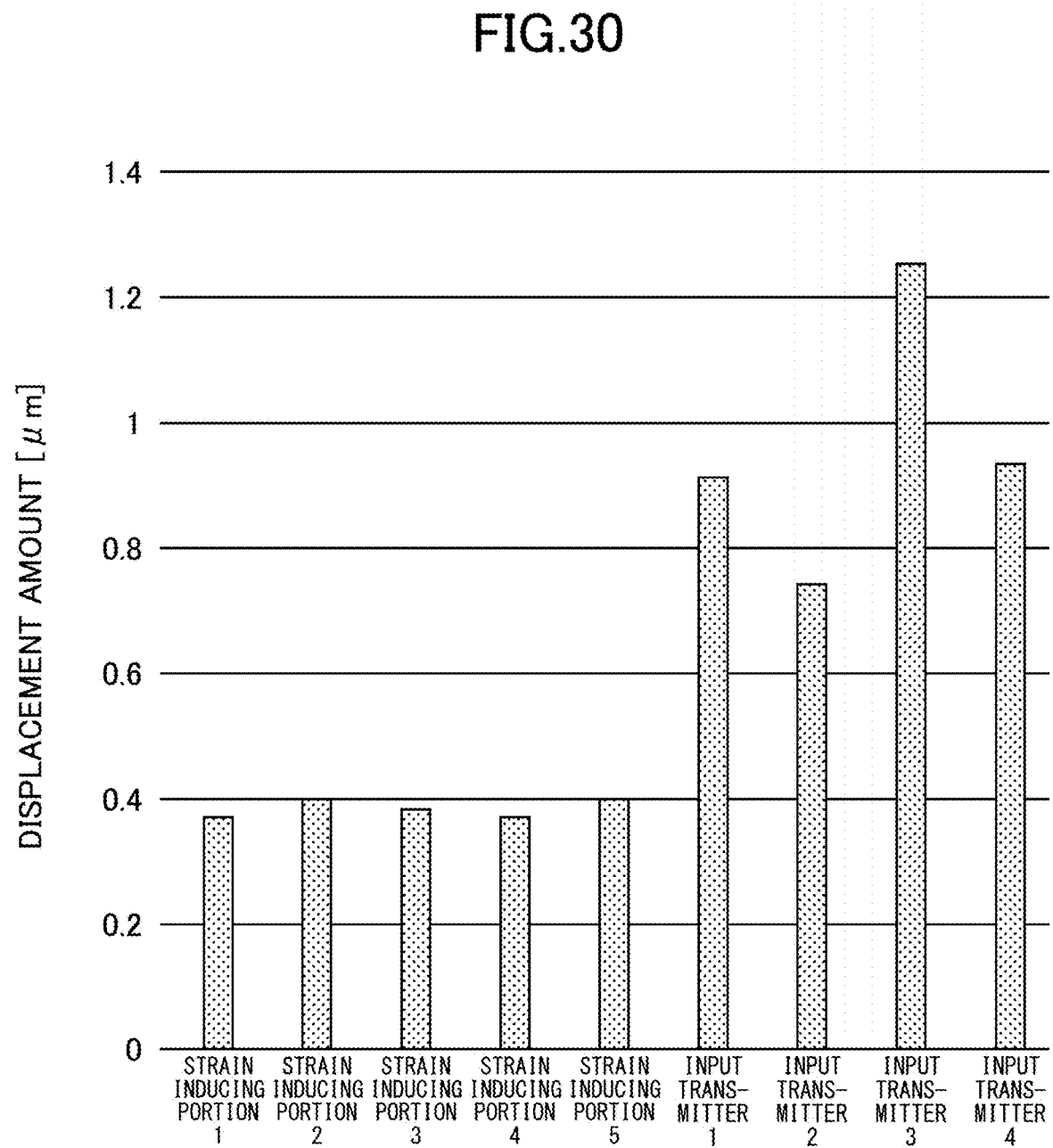
FIG. 30 is a diagram summarizing the displacement amount of each part of the structure of FIG. 26 of the comparative example.
Figure 31:
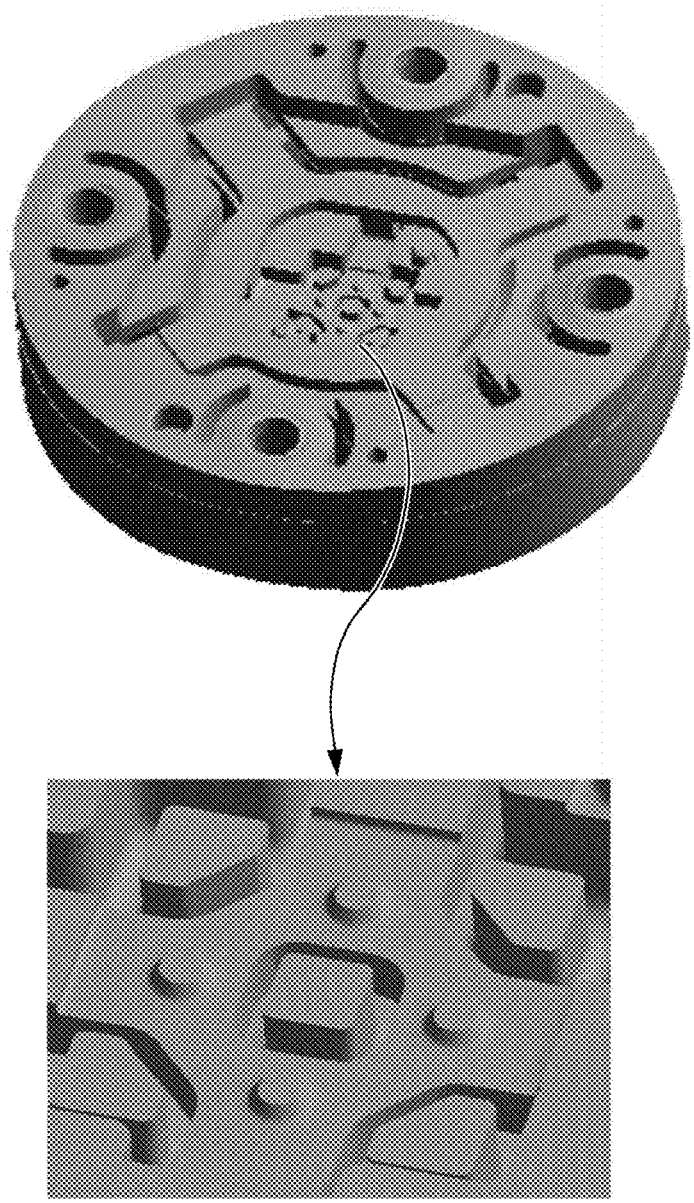
FIG. 31 is a displacement contour diagram of the structure of FIG. 27 of the present embodiment.
Figure 32:
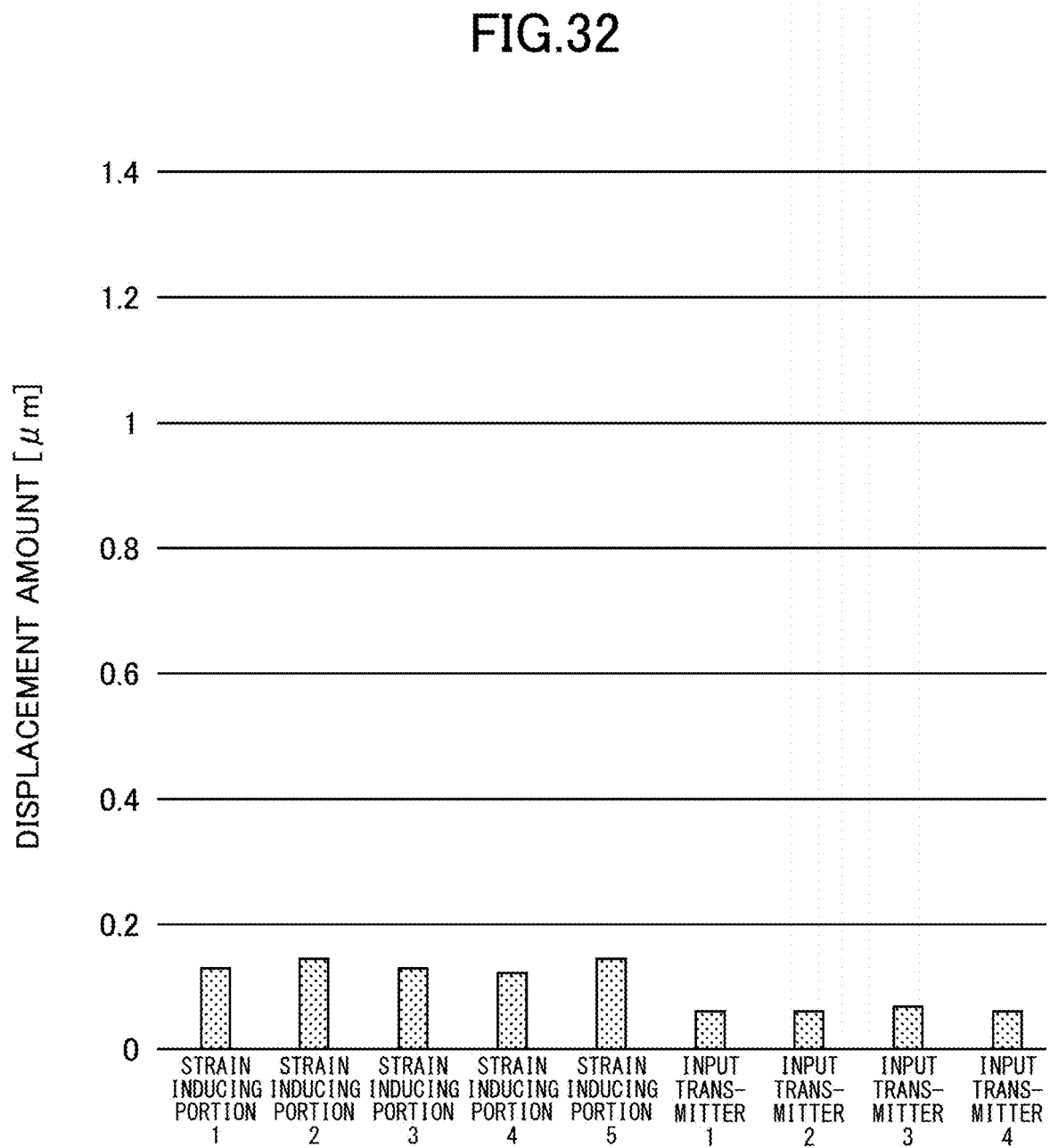
FIG. 32 is a diagram summarizing the displacement amount of each part of the structure of FIG. 27 of the present embodiment.

FIG. 29 is a displacement contour diagram of the structure of FIG. 26 in the comparative example, and FIG. 30 is a diagram summarizing the displacement amount of each part of the structure of FIG. 26 of the comparative example. FIG. 31 is a displacement contour diagram of the structure of FIG. 27 of the present embodiment, and FIG. 32 is a diagram summarizing the displacement amount of each part of the structure of FIG. 27 of the present embodiment. In each displacement contour diagram, the lower side of the arrow is enlarged in the vicinity of the portion where the sensor chip 100 is located.

From the results of FIGS. 29 to 32, in the structure of FIG. 27 of the present embodiment, the displacement amount of each measurement point of the strain inducing portion is suppressed to 50% or less in comparison with the structure of FIG. 26 of the comparative example. In addition, In the structure of FIG. 27 of the present embodiment, the displacement amount of the input transmitter is suppressed to 10% or less relative to the structure of FIG. 26 of the comparative example.

In the structure of FIG. 27 of the present embodiment, the difference between the displacement amount of the strain inducing portion with respect to the input and the displacement amount of the input transmitter is small in comparison with the structure of FIG. 26 of the comparative example. The difference between the displacement amount of the strain inducing portion with respect to the input and the displacement amount of the input transmitter is the input to the sensor chip 100. Therefore, the structure illustrated in FIG. 27 of the present embodiment reduces the offset of the sensor chip 100 caused by the force generated when the strain inducing body is fastened to the target object by screws in comparison with the structure illustrated in FIG. 26 of the comparative example. That is, the adverse effects, to load capacity, force characteristics, offset temperature characteristics, and offset variation on the sensor chip 100 caused by the force when fastening the strain inducing body to the target object with screws and the temperature distribution to the strain inducing body, can be reduced.

[Simulation 1]

Herein, the results of Simulation 1, which was performed on the structures illustrated in FIG. 26 and FIG. 27 are explained. In Simulation 1, the Z-displacement difference was checked when the lower surface of the force receiving plate attached to the target object under a steady state at 35° C., followed by raising the temperature to 40° C. at a rate of 1° C./s. The Z-displacement difference is the value obtained by subtracting the average of the displacements in the Z-direction of the top ends of the five first connection portions 224 from the average of the displacements in the Z-direction of the top ends of the four second connection portions 235d.

Simulation 1 was performed on a ¼ model (size) of the structure illustrated in FIG. 26 and FIG. 27. In the structure of FIG. 27, the length of the beam structure 233 was set to 8 mm, the width of the beam structure 233 was set to 4 mm, the length of the counterbore part 233a was set to 5 mm, the thickness $T_1$ of the central portion 232 side of the beam structure 233 in the counterbore part 233a was set to 1.5 mm, the thickness $T_2$ of the counterbore part 233a was set to 1.25 mm.

Figure 33:
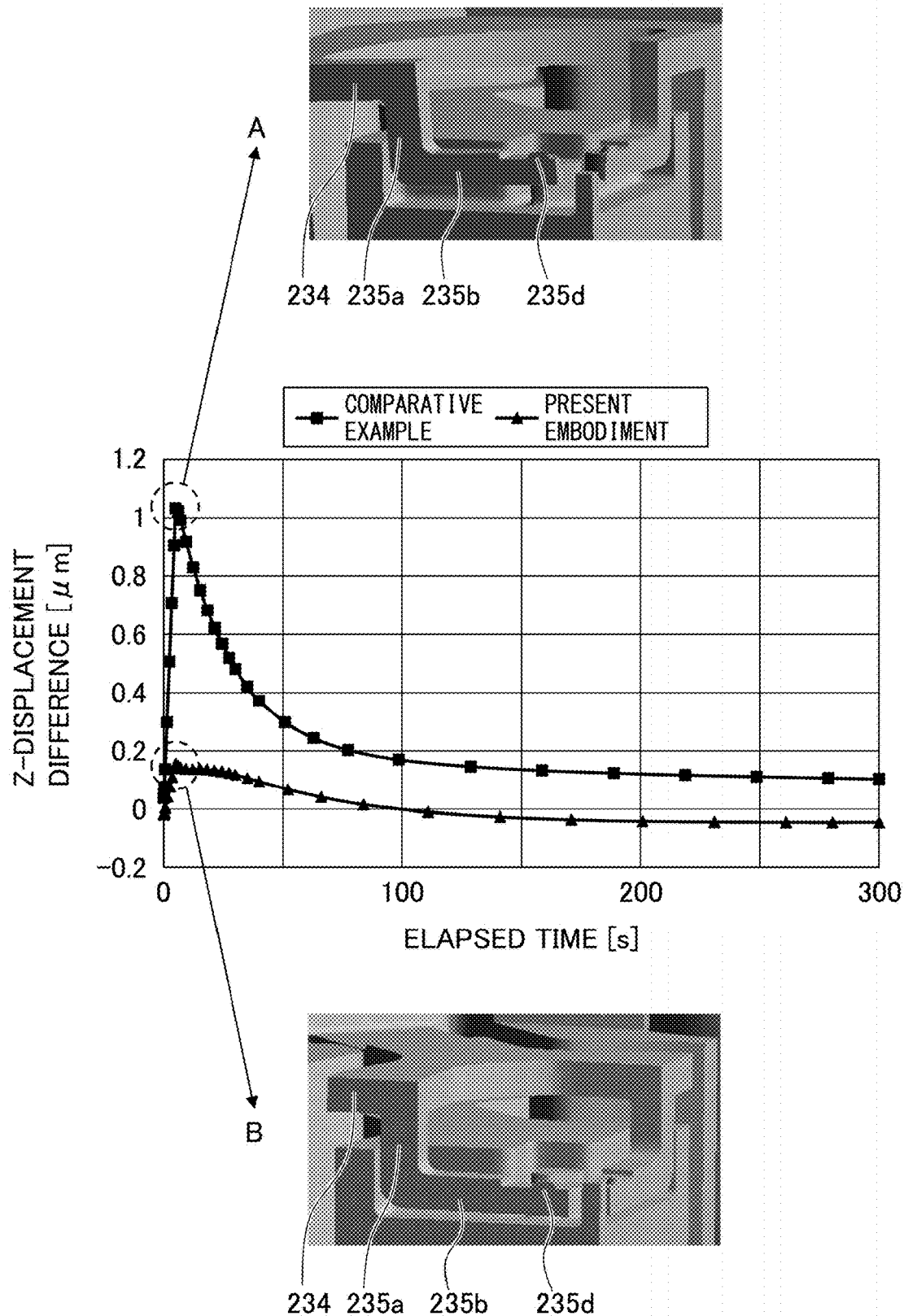
FIG. 33 is a diagram illustrating a result of simulation 1.

FIG. 33 is a diagram illustrating the result of simulation 1. The graph in FIG. 33 shows the change of the Z-displacement difference against the elapsed time. The graph in FIG. 33 shows the displacement contour of points A and B where the Z-displacement difference is the largest. In the graph in FIG. 33, the comparative example is a ¼ model of the structure in FIG. 26, and the model of the present embodiment is a ¼ model of the structure in FIG. 27.

As illustrated in FIG. 33, the Z-displacement difference reaches maximum when the elapsed time is about 5 s in the structure of FIG. 26 in the comparative example. Thereafter, the Z-displacement difference decreases with elapsed time and stabilizes at about 0.1 μm. On the other hand, the Z-displacement difference reaches maximum when the elapsed time is about 5 s in the structure of FIG. 27, and the value is about 0.15 μm. Thereafter, the Z-displacement difference decreases with elapsed time and stabilizes at about −0.05 μm.

Also, from the contour diagram in FIG. 33, it can be seen that in addition to the large Z-displacement difference in the structure of FIG. 26 in the comparative example, the mutual positional relationship of the second connection portion 235d is not maintained. In contrast, in the structure of FIG. 27, the Z-displacement difference is small, and the mutual positional relationship of the second connection portion 235d is also maintained.

Thus, in the structure of FIG. 27 of the present embodiment, the Z-displacement difference that occurs when a temperature distribution occurs can be greatly reduced compared to the structure of FIG. 26 of the comparative example. In addition, the mutual positional relationship of the second connection portion 235d can be maintained. In other words, the structure illustrated in FIG. 27 of the present embodiment can reduce the offset of the sensor chip 100, which occurs when temperature distribution occurs in the strain inducing body compared to the structure illustrated in FIG. 26 of the comparative example.

[Simulation 2]

In Simulation 2, in the structure of FIG. 27, when $T_2$ and $T_2$ are 1.0 mm and 1.5 mm, respectively (that is, counterbore part 233a is not present), same simulation as the simulation 1 was performed. The results of the simulation 2 was compared with the results of the simulation 1 of $T_2$=1.25 mm. In the simulation 2, the same simulations as in the simulation 1 were performed except that the condition of $T_2$.

Figure 34:
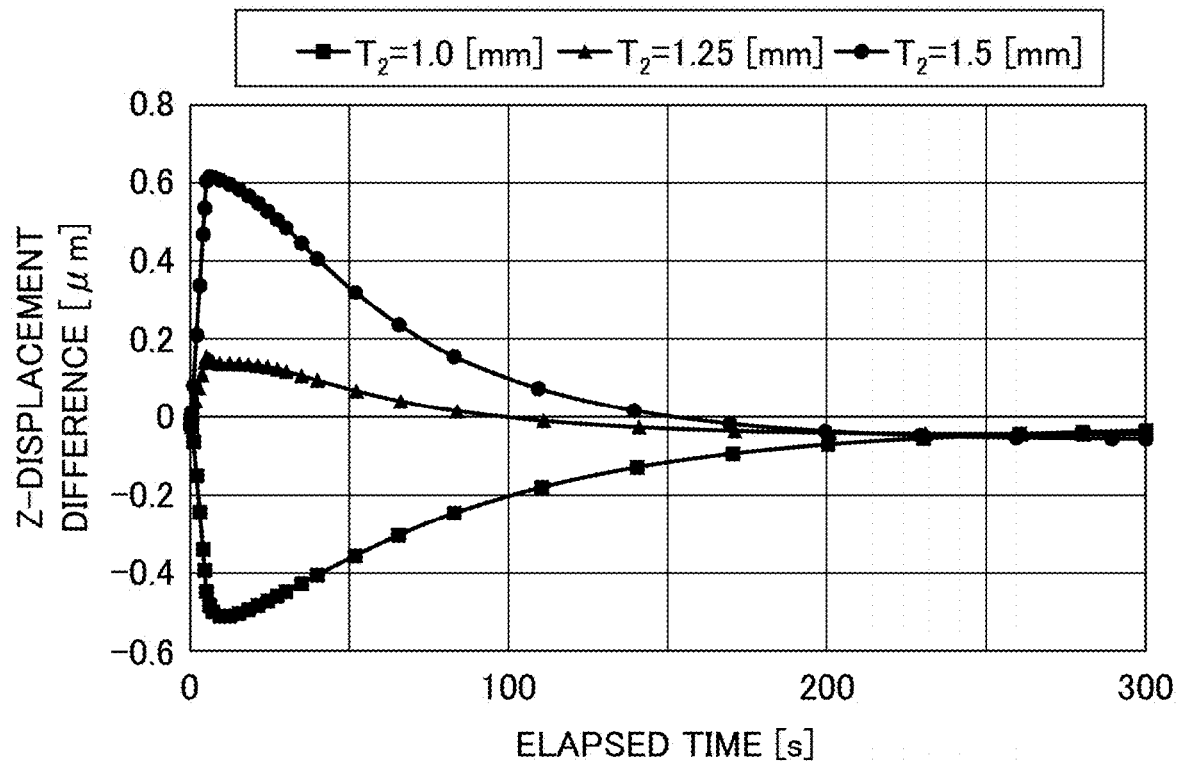
FIG. 34 is a diagram illustrating a result of simulation 2.

As illustrated in FIG. 34, the maximum value of the Z-displacement difference when $T_2$ of 1.5 mm was about 0.6 μm. On the other hand, the maximum value of the Z-displacement difference when $T_2$ of 1.0 mm was about −0.5 μm. When $T_2$ of 1.0 mm, the displacement direction becomes opposite against $T_2$ of 1.5 mm, but the absolute value was slightly improved. In addition, the maximum value of the Z-displacement difference when $T_2$ of 1.25 mm was about 0.15 μm. when $T_2$ of 1.25 mm, the Z-displacement difference was greatly improved compared to when $T_2$ of 1.0 mm and $T_2$ of 1.5 mm.

Thus, there is an optimum value for the thickness $T_2$ of the counterbore part 233a. The thickness $T_2$ of the counterbore part 233a is preferably adjusted in the range of thicker than 1.0 mm and thinner than 1.5 mm, and more preferably adjusted in the range of thicker than 1.0 mm and thinner than 1.25 mm.

While the preferred embodiments have been described in detail above, various modifications and substitutions can be made to the embodiments described above without departing from the scope of the claims.

For example, in the embodiments described above, an example of fastening the strain inducing body to a target object with screws has been described, but is not limited thereto, and various fasteners can be used, such as bolts, rivets, and the like, which can fix the strain inducing body to the target object.

What is claimed is:

1. A strain inducing body comprising:
a strain inducing portion including a movable portion that deforms in response to force or moment in a predetermined axial direction and a non-movable portion that does not deform in response to the force or moment; and
an input transmitter that is connected to the non-movable portion and does not deform in response to the force or moment,
wherein the input transmitter includes,
a first frame portion,
a plurality of first beam structures each of which has one end thereof connected to the first frame portion and extends from the first frame portion to an inside of the first frame portion,
a first coupling portion that connects other ends of the first beam structures,
an accommodating portion that is provided inside and is fixedly connected to the first coupling portion and that is capable of housing a sensor chip to detect the force or the moment.

2. The strain inducing body according to claim 1, wherein a plurality of the first beam structures includes two opposing first beam structures facing each other across a center of the first frame portion and the other two opposing first beam structures facing each other across the center of the first frame portion.

3. The strain inducing body according to claim 2, wherein the accommodating portion includes,
four vertical supports connected at one end to the first coupling portion and extending vertically from the first coupling portion toward the strain inducing portion,
four horizontal supports extending horizontally from ends of the vertical supports, and
a second coupling portion that connects other ends of the horizontal supports, and
wherein the two vertical supports and the two horizontal supports face each other across the center of the first frame portion in a plan view, and the other two vertical supports and the other two horizontal supports face each other across the center of the first frame portion in a plan view.

4. The strain inducing body according to claim 3, wherein a virtual straight line connecting centers of width directions of the two opposing first beam structures facing each other across the center of the first frame portion and a virtual straight line connecting centers of width directions of the other two opposing first beam structures facing each other across the center of the first frame portion form a virtual first cross line perpendicular to each other in a plan view.

5. The strain inducing body according to claim 4, wherein a virtual straight line connecting centers of widths directions of the two opposing vertical supports and the two opposing horizontal supports facing each other across the center of the first frame portion and a virtual straight line connecting centers of the other two opposing vertical supports and the other two opposing horizontal supports facing each other across the center of the first frame portion form a virtual second cross line perpendicular to each other in a plan view.

6. The strain inducing body according to claim 1, wherein the strain inducing portion includes,
a second frame portion,
a central portion that is separated from the second frame portion and disposed inside of the second frame portion,
a plurality of second beam structures each of which bridges the second frame portion and the central portion, and
wherein the second frame portion is included in the non-movable portion, and the second beam structure and the central portion are included in the movable portion.

7. The strain inducing body according to claim 6, wherein each of the second beam structure is a T-patterned structure including a first beam and a second beam extending from a center of the first beam in a direction perpendicular to the first beam, and
wherein both ends of the first beam are connected to the second frame portion, and an end of the second beam is connected to the central portion.

8. The strain inducing body according to claim 6, wherein a plurality of the second beam structures includes two opposing second beam structures facing each other across a center of the second frame portion and the other two opposing second beam structures facing each other across the center of the second frame portion.

9. The strain inducing body according to claim 8, wherein a virtual straight line connecting centers of widths directions of the two opposing second beam structures facing each other across the center of the second frame portion and a virtual straight line connecting centers of the other two opposing second beam structures facing each other across the center of the second frame portion form a virtual third cross line perpendicular to each other in a plan view.

10. The strain inducing body according to claim 6, wherein the second beam structure and the first beam structure at least partially overlap in a plan view.

11. A force sensor device comprising a strain inducing body and a sensor chip, wherein the strain inducing body comprises:
a strain inducing portion including a movable portion that deforms in response to force or moment in a predetermined axial direction and a non-movable portion that does not deform in response to the force or moment, and
an input transmitter that is connected to the non-movable portion and does not deform in response to the force or moment,
wherein the input transmitter includes,
a first frame portion,
a plurality of first beam structures each of which has one end thereof connected to the first frame portion and extends from the first frame portion to an inside of the first frame portion,
a first coupling portion that connects other ends of the first beam structures,
an accommodating portion that is provided inside and is fixedly connected to the first coupling portion and that is capable of housing the sensor chip to detect the force or the moment.

12. A strain inducing body comprising:
a strain inducing portion including a movable portion that deforms in response to force or moment in a predetermined axial direction and a non-movable portion that does not deform in response to the force or moment; and
an input transmitter that is connected to the non-movable portion and does not deform in response to the force or moment,
wherein the input transmitter includes,
a first frame portion,
a plurality of first beam structures each of which has one end thereof connected to the first frame portion and extends from the first frame portion to an inside of the first frame portion,
a first coupling portion that connects other ends of the first beam structures,
an accommodating portion that is provided inside the first coupling portion and that is connected to a bottom surface of a sensor chip to detect the force or the moment.

13. A strain inducing body comprising:
a strain inducing portion including a movable portion that deforms in response to force or moment in a predetermined axial direction and a non-movable portion that does not deform in response to the force or moment; and
an input transmitter that is connected to the non-movable portion and does not deform in response to the force or moment,
wherein the input transmitter includes,
a first frame portion,
a plurality of first beam structures each of which has one end thereof connected to the first frame portion and extends from the first frame portion to an inside of the first frame portion,
a first coupling portion that connects other ends of the first beam structures,
an accommodating portion that is provided inside the first coupling portion and that is capable of housing a sensor chip to detect the force or the moment,
wherein a plurality of the first beam structures includes two opposing first beam structures facing each other across a center of the first frame portion and the other two opposing first beam structures facing each other across the center of the first frame portion,
wherein the accommodating portion includes,
four vertical supports connected at one end to the first coupling portion and extending vertically from the first coupling portion toward the strain inducing portion,
four horizontal supports extending horizontally from ends of the vertical supports, and
a second coupling portion that connects other ends of the horizontal supports, and
wherein the two vertical supports and the two horizontal supports face each other across the center of the first frame portion in a plan view, and the other two vertical supports and the other two horizontal supports face each other across the center of the first frame portion in a plan view.

\* \* \* \* \*